US008966783B2

(12) United States Patent
Kitamura et al.

(10) Patent No.: US 8,966,783 B2
(45) Date of Patent: Mar. 3, 2015

(54) VACUUM-PRESSURE SPRAY-DRYING METHOD AND VACUUM-PRESSURE SPRAY-DRYING DEVICE

(75) Inventors: Yutaka Kitamura, Tsukuba (JP); Kazuhiko Yamazaki, Yoshikawa (JP); Yoshitsugu Yamano, Yoshikawa (JP)

(73) Assignee: Tanabe Engineering Corporation, Zyouetsu-Shi (JP)

( * ) Notice: Subject to any disclaimer, the term of this patent is extended or adjusted under 35 U.S.C. 154(b) by 129 days.

(21) Appl. No.: 13/812,818

(22) PCT Filed: Jul. 27, 2011

(86) PCT No.: PCT/JP2011/067065
§ 371 (c)(1),
(2), (4) Date: Jan. 28, 2013

(87) PCT Pub. No.: WO2012/014923
PCT Pub. Date: Feb. 2, 2012

(65) Prior Publication Data

US 2013/0126102 A1 May 23, 2013

(30) Foreign Application Priority Data

Jul. 29, 2010 (JP) ................................ 2010-170765

(51) Int. Cl.
*F26B 5/00* (2006.01)
*B01D 1/14* (2006.01)
(Continued)

(52) U.S. Cl.
CPC ... *B01D 1/14* (2013.01); *A23L 3/46* (2013.01); *B01D 1/18* (2013.01); *B01D 1/20* (2013.01); (Continued)

(58) Field of Classification Search
USPC ............... 34/284, 287, 289, 372, 470, 90, 92, 34/137, 140; 62/64; 159/4.01, 4.02, 79.2
See application file for complete search history.

(56) References Cited

U.S. PATENT DOCUMENTS 2,217,547 A * 10/1940 Hall ................................ 159/4.1

(Continued)

FOREIGN PATENT DOCUMENTS

CA 1021517 * 11/1927

(Continued)

OTHER PUBLICATIONS

International Search Report for PCT/JP2011/067065 dated Nov. 1, 2011.

(Continued)

*Primary Examiner* — Steve M Gravini

(74) *Attorney, Agent, or Firm* — Birch, Stewart, Kolasch & Birch, LLP

(57) ABSTRACT

Provided are a novel vacuum-pressure spray-drying method and a novel vacuum-pressure spray-drying apparatus suitable for drying and powdering a liquid raw material containing a substance susceptible to heat denaturation, such as a food raw material and a medicine raw material. The vacuum-pressure spray-drying method and the like include: an apparatus main body, which is kept at reduced pressure and includes a spray nozzle; superheated water vapor supplying means for supplying a superheated water vapor to the spray nozzle; liquid raw material supplying means for supplying a liquid raw material to the spray nozzle; cooling means for cooling the superheated water vapor and a vapor resulting from volatilization of the liquid raw material being discharged from the apparatus main body, and then collecting, as condensed water; pressure reducing means for keeping an inside of the apparatus main body at the reduced pressure through the cooling means; and product collecting means for collecting a powder product produced in the apparatus main body. The vacuum-pressure spray-drying method and the like include: simultaneously spraying the superheated water vapor supplied from the superheated water vapor supplying means and the liquid raw material supplied from the liquid raw material supplying means through the spray nozzle into the apparatus main body so as to atomize the liquid raw material in the apparatus main body; and subjecting an atomized raw material, which is produced by atomizing the liquid raw material, to heat exchange with the superheated water vapor, to thereby dry and powder the liquid raw material.

19 Claims, 12 Drawing Sheets

(51) Int. Cl.
*A23L 3/46* (2006.01)
*B01D 1/18* (2006.01)
*B01D 1/20* (2006.01)
*B01J 2/04* (2006.01)
*F26B 3/12* (2006.01)
*F26B 5/04* (2006.01)
*A23C 1/04* (2006.01)

(52) U.S. Cl.
CPC ... *B01J 2/04* (2013.01); *F26B 3/12* (2013.01); *F26B 5/04* (2013.01); *A23C 1/045* (2013.01)
USPC .................. 34/372; 34/470; 34/137; 34/140; 159/4.01; 159/4.08

(56) References Cited

U.S. PATENT DOCUMENTS

| | | | | | |
|---|---|---|---|---|---|
| 2,572,857 | A | * | 10/1951 | Hall et al. | 159/48.1 |
| 3,930,931 | A | | 1/1976 | Baughman | |
| 3,962,798 | A | * | 6/1976 | Jackson | 34/340 |
| 4,583,301 | A | * | 4/1986 | Crowley et al. | 34/73 |
| 4,893,415 | A | * | 1/1990 | Moldrup | 34/406 |
| 5,232,550 | A | | 8/1993 | Takashi et al. | |
| 5,736,003 | A | * | 4/1998 | Granelli | 159/31 |
| 6,058,623 | A | * | 5/2000 | Brooks et al. | 34/362 |
| 6,769,200 | B2 | * | 8/2004 | Raehse et al. | 34/372 |
| 8,051,637 | B2 | * | 11/2011 | Labrador | 60/39.01 |
| 8,196,312 | B2 | * | 6/2012 | Taguchi | 34/443 |
| 8,826,558 | B2 | * | 9/2014 | Priebe et al. | 34/60 |
| 2005/0031692 | A1 | | 2/2005 | Beyerinck et al. | |
| 2011/0245072 | A1 | * | 10/2011 | Yang et al. | 502/245 |
| 2013/0126102 | A1 | * | 5/2013 | Kitamura et al. | 159/4.4 |

FOREIGN PATENT DOCUMENTS

| | | | | | |
|---|---|---|---|---|---|
| DE | 1169915 | | * | 5/1964 | |
| GB | 1458316 | A | * | 12/1976 | |
| JP | 49-104256 | | | 10/1974 | |
| JP | 50-58184 | | | 5/1975 | |
| JP | 58-78102 | | | 5/1983 | |
| JP | 62019073 | A | * | 1/1987 | A23P 1/06 |
| JP | 63-267402 | A | | 11/1988 | |
| JP | 2005-287373 | A | | 10/2005 | |
| JP | 2005-291598 | A | | 10/2005 | |
| JP | 2006-297243 | A | | 11/2006 | |
| JP | 2006-333838 | A | | 12/2006 | |
| JP | 2007-501219 | A | | 1/2007 | |
| JP | 2009-103398 | A | | 5/2009 | |
| JP | 2009-130098 | A | | 6/2009 | |

OTHER PUBLICATIONS

Aoyama et al., "Experimental Analysis of Spraying and Drying Characteristics in Vacuum Spray Dryer," Journal of Japan Society for Food Engineering, vol. 10, No. 2, pp. 127-133, Jun. 2009.
International Preliminary Report on Patentability for International Patent Application No. PCT/JP2011/067065, dated Feb. 7, 2013.
Partial Translation for JP-49-104256-A, published Oct. 2, 1974.
Partial Translation for JP-58-78102-U, published May 26, 1983.
Written Submission of Certificate for Exception to Lack of Novelty for Priority Japanese Patent Application No. 2010-170765, dated Jul. 30, 2010.

* cited by examiner

VACUUM-PRESSURE SPRAY-DRYING METHOD AND VACUUM-PRESSURE SPRAY-DRYING DEVICE

TECHNICAL FIELD

The present invention relates to a vacuum-pressure spray-drying method and a vacuum-pressure spray-drying apparatus for drying and powdering a liquid raw material at reduced pressure. In particular, the present invention relates to, but is not particularly limited to, a vacuum-pressure spray-drying method and a vacuum-pressure spray-drying apparatus suitable for drying and powdering a liquid raw material obtained by dissolving or dispersing, into water or the like, a substance that is susceptible to heat denaturation and easily oxidized, decomposed, or degraded when being heated. Examples of the substance include lactic acid bacteria, a vitamin C, an aroma component of tea, heat-sensitive natural food, and a food raw material and a medicine raw material containing the above-mentioned components.

BACKGROUND ART

Hitherto, as a method of drying at low temperature a substance susceptible to heat denaturation, some technologies have been proposed.

For example, Patent Literature 1 (JP 2005-287373 A) proposes the following method. Specifically, a depressurized superheated vapor is introduced into the drying apparatus main body kept at reduced pressure, and an object to be dried such as food, which is susceptible to heat denaturation and placed in the drying apparatus main body, is dried by the depressurized superheated vapor.

However, in this method, the placed object to be dried is subjected to contact and heat exchange with the depressurized superheated vapor. Accordingly, when the object to be dried is a liquid raw material, it is difficult to ensure a large evaporating heating surface, and there is a problem in that the apparatus is increased in size in order to ensure the large evaporating heating surface.

Further, Patent Literature 2 (JP 2005-291598 A) proposes the following method. Specifically, fluidized particles such as glass beads, and an object to be dried such as food, which is susceptible to heat denaturation, are charged into the fluidized bed drying apparatus main body, and a depressurized superheated vapor is introduced into the fluidized bed drying apparatus main body at reduced pressure. The object to be dried and the depressurized superheated vapor are brought into contact with each other in a fluidized state. In this manner, the object to be dried is dried.

However, also in this method, it is necessary that the object to be dried be mixed with the fluidized particles in the fluidized bed drying apparatus main body so as to form the fluidized state, and hence this method is inappropriate as a method of drying and powdering a liquid raw material as a substance susceptible to heat denaturation.

Still further, Patent Literature 3 (JP 2006-297243 A) proposes the following vacuum spray dryer. Specifically, liquid to be dried is atomized by the ultrasonic atomizing device. Spray droplets thus generated are introduced into the vacuum chamber, and are heated by the heating means such as a silicone rubber heater fixed to the outer peripheral surface of the vacuum chamber. The spray droplets are heated and dried at reduced pressure, and thus are powdered.

However, in this method, from the heating means fixed to the outer peripheral surface of the vacuum chamber, heat is transferred in a vacuum to the spray droplets introduced into the vacuum chamber. Accordingly, there is a problem in that a heat transfer efficiency is poor.

Still further, Patent Literature 4 (JP 2006-333838 A) proposes the following method. Specifically, using the compressed air, fermented milk is sprayed into the drying tower kept at reduced pressure, and is heated by the far-infrared heater provided to the drying tower. The atomized fermented milk is dried at a temperature of 50° C. or lower at reduced pressure. In this manner, fermented milk powder is produced.

However, in this method, due to lack of quantity of the air that is introduced into the drying tower so as to flow in the drying tower, it is difficult to blow off the fermented milk powder produced by drying. Further, radiation heat from the far-infrared heater is less likely to transfer to the center portion of the inside of the drying tower. Accordingly, there is a problem in that this method is inappropriate for high-volume production in spite of its appropriateness for low-volume production.

Patent Literature 5 (JP 2009-103398 A) proposes the following method. Specifically, raw material liquid such as chemicals, and spraying gas such as nitrogen gas are introduced via the two fluid nozzle into the dryer main body kept at reduced pressure, and the raw material liquid is atomized in the dryer main body. Further, heating gas formed of the air or nitrogen gas is introduced into the dryer main body from the hot air introducing portion provided on the outer peripheral side of the dryer main body. In this manner, the raw material liquid atomized in the dryer main body is dried and powdered by the heating gas.

However, in this method, the heating gas is formed of non-liquefied gas (which is non-condensable) such as the air and nitrogen gas. Accordingly, it is difficult to keep a constant degree of vacuum of the inside of the dryer main body, and a large quantity of gas is required in order to ensure a heat quantity necessary for drying because the heating gas has a relatively small heat capacity. Further, the hot air introducing portion for introducing the heating gas is separated from the two fluid nozzle, and hence heat of the heating gas is not sometimes transferred efficiently to the atomized raw material liquid. Therefore, there is a problem in that the apparatus is increased in size and it is difficult to perform powdering in a short period of time.

CITATION LIST

Patent Literature

[PTL 1] JP 2005-287373 A
[PTL 2] JP 2005-291598 A
[PTL 3] JP 2006-297243 A
[PTL 4] JP 2006-333838 A
[PTL 5] JP 2009-103398 A

SUMMARY OF INVENTION

Technical Problems

Accordingly, the inventors of the present invention eagerly examined a vacuum-pressure spray-drying method and a vacuum-pressure spray-drying apparatus suitable for drying and powdering the liquid raw material containing the above-mentioned substance susceptible to heat denaturation, such as a food raw material and a medicine raw material. As a result, the inventors of the present invention found out the fact described below, and completed the present invention. That is, a liquid raw material is dried and powdered in such a manner that, using a superheated water vapor as a heat source, the superheated water vapor and the liquid raw material are simultaneously sprayed through a spray nozzle into an apparatus main body kept at reduced pressure, and the liquid raw material is atomized and changed into an atomized raw material in the apparatus main body, and then the produced atomize draw material is subjected to heat exchange with the superheated water vapor at reduced pressure. Thus, it is possible to dry and powder the liquid raw material at low temperature quickly. In addition, it is possible to alleviate a load that is applied on a vacuum pump when keeping an inside of the apparatus main body at a predetermined degree of vacuum.

Therefore, it is an object of the present invention to provide a novel vacuum-pressure spray-drying method and a novel vacuum-pressure spray-drying apparatus suitable for drying and powdering the liquid raw material containing the substance susceptible to heat denaturation, such as a food raw material and a medicine raw material.

Solution to Problems

Specifically, according to the present invention, there is provided a vacuum-pressure spray-drying method, including: an apparatus main body, which is kept at reduced pressure and includes a spray nozzle; superheated water vapor supplying means for supplying a superheated water vapor to the spray nozzle; liquid raw material supplying means for supplying a liquid raw material to the spray nozzle; cooling means for cooling the superheated water vapor and a vapor resulting from volatilization of the liquid raw material being discharged from the apparatus main body, and then collecting, as condensed water; pressure reducing means for keeping an inside of the apparatus main body at the reduced pressure through the cooling means; and product collecting means for collecting a powder product produced in the apparatus main body, the vacuum-pressure spray-drying method including: simultaneously spraying the superheated water vapor supplied from the superheated water vapor supplying means and the liquid raw material supplied from the liquid raw material supplying means through the spray nozzle into the apparatus main body so as to atomize the liquid raw material in the apparatus main body; and subjecting an atomized raw material, which is produced by atomizing the liquid raw material, to heat exchange with the superheated water vapor, to thereby dry and powder the liquid raw material.

Further, according to the present invention, there is provided a vacuum-pressure spray-drying apparatus, including: an apparatus main body, which is kept at reduced pressure and includes a spray nozzle; superheated water vapor supplying means for supplying a superheated water vapor to the spray nozzle; liquid raw material supplying means for supplying a liquid raw material to the spray nozzle; cooling means for cooling the superheated water vapor and a vapor resulting from volatilization of the liquid raw material being discharged from the apparatus main body, and then collecting, as condensed water; pressure reducing means for keeping an inside of the apparatus main body at the reduced pressure through the cooling means; and product collecting means for collecting a powder product produced in the apparatus main body, in which the spray nozzle includes a nozzle which includes: a spray port formed at a center position of the nozzle, for spraying the liquid raw material; and a spout port formed around the spray port, for spouting the superheated water vapor, and in which the vacuum-pressure spray-drying apparatus is configured to: simultaneously spray the superheated water vapor supplied from the superheated water vapor supplying means and the liquid raw material supplied from the liquid raw material supplying means through the spray nozzle into the apparatus main body so as to atomize the liquid raw material in the apparatus main body; and subject an atomized raw material, which is produced by atomizing the liquid raw material, to heat exchange with the superheated water vapor, to thereby dry and powder the liquid raw material.

Still further, according to the present invention, there is provided a vacuum-pressure spray-drying apparatus, including: an apparatus main body, which is kept at reduced pressure and includes a spray nozzle; superheated water vapor supplying means for supplying a superheated water vapor to the spray nozzle; liquid raw material supplying means for supplying a liquid raw material to the spray nozzle; cooling means for cooling the superheated water vapor and a vapor resulting from volatilization of the liquid raw material being discharged from the apparatus main body, and then collecting, as condensed water; pressure reducing means for keeping an inside of the apparatus main body at the reduced pressure through the cooling means; and product collecting means for collecting a powder product produced in the apparatus main body, in which the spray nozzle includes: a first spray nozzle including a spout port for spouting the superheated water vapor; and a second spray nozzle comprising a spray port for spraying the liquid raw material, and arranged so as to be opposed to the first spray nozzle with a spacing, and in which the vacuum-pressure spray-drying apparatus is configured to: spray the superheated water vapor supplied from the superheated water vapor supplying means through the first spray nozzle into the apparatus main body while spraying the liquid raw material supplied from the liquid raw material supplying means through the second spray nozzle into the apparatus main body so as to collide with the superheated water vapor and atomize the liquid raw material in the apparatus main body; and subject an atomized raw material, which is produced by atomizing the liquid raw material, to heat exchange with the superheated water vapor, to thereby dry and powder the liquid raw material.

According to the present invention, the apparatus main body for performing spray-drying at reduced pressure is not particularly limited as long as the apparatus main body can atomize the liquid raw material in the apparatus main body and can subject the atomized raw material produced by atomizing the liquid raw material to heat exchange with the superheated water vapor. However, it is preferred that the apparatus main body be an evaporator including: a spray nozzle provided on one end side of the evaporator; and an outlet formed on another end side of the evaporator in communication to the cooling means. Alternatively, it is preferred that the apparatus main body be an evaporator including: a first spray nozzle provided on one end side of the evaporator, for spraying the superheated water vapor; an outlet formed on another end side of the evaporator in communication to the cooling means; and a second spray nozzle arranged on the another end side of the evaporator so as to be opposed to the first spray nozzle with a spacing, for spraying the liquid raw material. When each evaporator described above is used, within a period in which the liquid raw material sprayed through the spray nozzle into the evaporator is moved to the outlet along with a flow of the superheated water vapor, the liquid raw material is atomized and changed into the atomized raw material, and is subjected to heat exchange with the superheated water vapor. Thus, the liquid raw material is dried and powdered. Further, with substantially no adhesion to the inner wall of the evaporator, the produced powder product is transferred to the outlet side along with the flow of the superheated water vapor.

Further, it is more preferred that the apparatus main body be an evaporator including: a spray nozzle (first spray nozzle) provided on an upper end side of the evaporator; and an outlet (outlet and second spray nozzle) formed on a lower end side of the evaporator, the evaporator being configured to cause the superheated water vapor to flow from an upper side to a lower side of the evaporator. When using this evaporator, the powder product, which is produced in the evaporator by drying and powdering, is more reliably transferred along with the flow of the superheated water vapor toward the outlet formed on the lower end side of the evaporator. Further, when using the evaporator including the first spray nozzle provided on the upper end side thereof, and the outlet and the second spray nozzle provided on the lower end side thereof, for example, even in a case where a liquid raw material, which may be changed in specific gravity and viscosity depending on properties and a concentration of a component thereof so that a state of the liquid raw material at the time of spraying may fluctuate, is applied as the liquid raw material, the atomized raw material obtained by atomizing the liquid raw material is satisfactorily dried and powdered in the evaporator, Further, the produced powder product is more reliably prevented from adhering to the inner wall of the evaporator, and heat degeneration of the product is more reliably prevented.

Further, according to the present invention, the product collecting means for collecting the powder product produced in the apparatus main body can be constructed, for example, through use of, as the apparatus main body, an evaporator in which a heat exchanging section as an upper part and a product collecting section as a lower part are separably coupled together. In this case, the heat exchanging section of the evaporator may include: a spray nozzle for supplying the liquid raw material into the heat exchanging section; and an outlet for discharging exhaust gas (gas mainly containing the superheated water vapor having undergone heat exchange with the atomized raw material in the apparatus main body, and a vapor resulting from volatilization of a solvent and a solute contained in the liquid raw material) transferred from the heat exchanging section to the cooling means, and thus the powder product dried and powdered in the heat exchanging section may be received in the product collecting section as the lower part.

Further, it is preferred to use, as the product collecting means, a cyclone collector arranged between the outlet of the apparatus main body and the cooling means. In this case, the powder product dried and powdered in the apparatus main body may be carried into the cyclone collector along with exhaust gas transferred from the apparatus main body to the cooling means, and may be collected in the cyclone collector after being separated into a solid and gas.

When using the cyclone collector as the product collecting means, there may be adopted a configuration (dry-keeping means) for collecting and drying a part of the gas separated in the cyclone collector, and then introducing and returning the part of the gas into an inside of a pipe connecting between the apparatus main body and the cyclone collector. In this case, for example, even in a case where a liquid raw material containing a highly hygroscopic substance is applied as the liquid raw material, the powder product obtained by drying and powdering the liquid raw material in the apparatus main body can be collected by the cyclone collector while keeping the powder product dry without moistening the powder product. Further, when using the cyclone collector as the product collecting means, there may be adopted a configuration (dry-maintaining means) for introducing dried air or nitrogen into an inside of a collecting section for collecting the solid separated in the cyclone collector as the powder product. In this case, for example, it is possible to collect the dried powder product in the collecting section of the cyclone collector while maintaining the powder product dry without moistening the powder product.

According to the present invention, the spray nozzle fixed to the apparatus main body needs to simultaneously spray the superheated water vapor and the liquid raw material into the apparatus main body so as to atomize the liquid raw material in the apparatus main body, to thereby produce the atomized raw material. It is preferred that the spray nozzle include: a spray port formed at a center position thereof, for spraying the liquid raw material; and a spout port formed around the spray port, for spouting the superheated water vapor. Further, it is more preferred that the spray nozzle be formed into a ring-shaped nozzle, and include: one or a plurality of spray ports formed at a center position thereof, for spraying the liquid raw material; and a spout port formed around the spray port (s) so as to surround the spray port (s), for spouting the superheated water vapor. In addition, as the above-mentioned second spray nozzle, a spray nozzle capable of spraying at least the liquid raw material is used, but a spray nozzle capable of spraying the superheated water vapor in addition to the liquid raw material may be used. Similarly to the above-mentioned case, the spray nozzle including: the spray port formed at the center position thereof, for spraying the liquid raw material; and the spout port formed around the spray port, for spouting the superheated water vapor is applicable also to the second spray nozzle.

It is only necessary that the above-mentioned spray port for the liquid raw material can atomize and change the liquid raw material into the atomized raw material. For example, the spray port can be formed of a discharge hole for liquid and a discharge hole for compressed gas such as compressed air. Further, the above-mentioned spout port for the superheated water vapor may have a configuration in which a discharge hole that is open in a ring-shaped manner is arranged around the spray port in a periphery of the above-mentioned spray port for the liquid raw material, or may have a configuration in which a large number of discharge holes each having a relatively small diameter are arranged at predetermined intervals. In addition, the spray port for spraying the liquid raw material, and the spout port formed around the spray port, for spouting the superheated water vapor may be formed to be close to each other, or may be formed to be separate from each other within a design allowable range.

It is particularly preferred to apply the following so-called ring-shaped spray nozzle as the spray nozzle described above. Specifically, the ring-shaped spray nozzle includes a spray port arranged at a center position thereof, for spraying the liquid raw material, the spray port including: a liquid raw material discharge hole formed in a center portion thereof, for discharging the liquid raw material; an air discharge hole situated on an outer side of the liquid raw material discharge hole to surround the liquid raw material discharge hole in a ring-shaped manner, for discharging heat-insulating air; and a saturated vapor discharge hole situated on an outer side of the air discharge hole to surround the air discharge hole in a ring-shaped manner, for discharging a spraying-use saturated vapor. The ring-shaped spray nozzle further includes a spout port situated on an outer side of the spray port configured as described above to surround the saturated vapor discharge hole in a ring-shaped manner, for spouting the superheated water vapor.

According to the above-mentioned spray nozzle, the liquid raw material, which is sprayed from the liquid raw material discharge hole formed in the center portion of the spray nozzle, is insulated from heating due to the heat-insulating air discharged from the air discharge hole, and is efficiently atomized due to spraying-use saturated vapor discharged from the saturated vapor discharge hole. Further, in the apparatus main body, the atomized raw material produced by atomizing the liquid raw material efficiently comes into contact with the superheated water vapor spouted from the spout port surrounding the saturated vapor discharge hole, and thus efficiently undergoes heat exchange with the superheated water vapor. In this manner, the atomized raw material is reliably dried and powdered before reaching the inner wall surface of the apparatus main body.

Further, according to the present invention, the superheated water vapor supplying means for supplying the superheated water vapor to the above-mentioned spray nozzle is not particularly limited to the above. However, in order to supply the superheated water vapor to the spray nozzle at precisely controlled temperature, it is preferred that the superheated water vapor supplying means include, in addition to a boiler, a heater provided between the boiler and the spray nozzle. Further, the liquid raw material supplying means for supplying the liquid raw material to the spray nozzle is not particularly limited to the above. For example, the liquid raw material supplying means may include a storage tank for temporarily storing the liquid raw material, and a feeding pump for feeding a certain quantity of the liquid raw material from the storage tank to the spray nozzle.

According to the present invention, it is only necessary that the cooling means for cooling exhaust gas discharged from the outlet of the apparatus main body and collecting condensed water from the exhaust gas basically include: a condenser for cooling the superheated water vapor and a vapor resulting from volatilization, which are contained in the exhaust gas; a cooling unit for circulating a refrigerant in and out of a heat exchanger of the condenser; and a receiver tank for collecting the condensed water generated by the condenser. Further, as the pressure reducing means for keeping the inside of the apparatus main body at reduced pressure through the cooling means, a vacuum pump is preferably used. Specifically, it is only necessary that the vacuum pump be connected to a position between the condenser and the receiver tank of the cooling means, and can keep the inside of the apparatus main body at predetermined reduced pressure through the condenser.

In addition, according to the present invention, it is preferred that heat retaining means be provided to the apparatus main body, and keep a warm state of the inner wall surface of the apparatus main body to prevent dew condensation. When the inner wall surface of the apparatus main body is kept in a warm state to prevent dew condensation in this manner, it is possible to forestall, for example, a problem in that the powder product produced by drying and powdering adheres to and solidifies on the inner wall surface of the apparatus main body, or the powder product absorbs dew generated by dew condensation and thus assumes an undry state. Further, when the above-mentioned cyclone collector is used as the product collecting means, the heat retaining means may be provided to each of the apparatus main body and the cyclone collector, or may be provided only to the cyclone collector.

According to the present invention, the liquid raw material which is to be subjected to vacuum-pressure spray-drying treatment is not particularly limited to the above. However, in order to spray the liquid raw material as fine droplets as possible, the liquid raw material has preferably a solid content of 20% by weight or more and 30% by weight or less, more preferably a solid content of 25% by weight or more and 28% by weight or less, and a remainder of the liquid raw material contains preferably water as a solvent and a small quantity of volatile component that is present in a solute. In this case, when the solid content is lower than 20% by weight, energy efficiency is poor in the vacuum-pressure spray-drying treatment. In contrast, when the solid content is higher than 30% by weight, a viscosity of the liquid raw material is increased, which causes a problem in that it is difficult to form fine droplets at the time of spraying.

Further, according to the present invention, vacuum-pressure spray-drying is performed under the following operation conditions: a degree of vacuum of the inside of the apparatus main body is set to normally 2 kPa or more and 20 kPa or less, preferably 5 kPa or more and 10 kPa or less; a vapor temperature of the superheated water vapor introduced into the apparatus main body is set to normally 120° C. or more and 250° C. or less, preferably 150° C. or more and 200° C. or less; and a temperature when performing drying in the apparatus main body is set to normally 15° C. or more and 80° C. or less, preferably 35° C. or more and 45° C. or less.

When the degree of vacuum of the inside of the apparatus main body is lower than 2 kPa, a refrigerant having low temperature is necessary for the condenser to condense moisture, which causes a problem in that cost is increased. In contrast, when the degree, of vacuum of the inside of the apparatus main body is higher than 20 kPa, a saturation temperature is increased, which causes a problem in that partial heat degeneration is more likely to occur. Further, when the vapor temperature of the superheated water vapor is lower than 120° C., a difference in temperature is extremely small, which causes a problem in that a necessary vapor quantity is extremely large. In contrast, when the vapor temperature of the superheated water vapor is higher than 250° C., there arises a problem in that partial heat degeneration is more likely to occur. In addition, when the temperature when performing drying in the apparatus main body is lower than 15° C., dew condensation is more likely to occur, which causes a problem in that dried power is moistened. In contrast, when the temperature when performing drying in the apparatus main body is higher than 80° C., there arises a problem in that partial heat degeneration is more likely to occur.

The operation conditions of the vacuum-pressure spray-drying are controlled within the above-mentioned ranges, and hence it is possible to efficiently dry and powder the liquid raw material containing a substance susceptible to heat denaturation, such as a food raw material and a medicine raw material containing lactic acid bacteria, vitamin C, an aroma component of tea, or the like, without causing heat denaturation of the substance.

In this case, when the operation conditions of the vacuum-pressure spray-drying performed in the apparatus main body are controlled within the above-mentioned ranges, a flow rate of the superheated water vapor flowing in the apparatus main body through the spray nozzle to the outlet is about 0.5 to 1.5 m/sec on average, and a flow rate of the exhaust gas flowing in the pipe from the outlet of the apparatus main body to the cyclone collector is about 15 to 60 m/sec, preferably about 20 to 40 m/sec. Those flow rates are enough for fluid transfer of powder, and hence the flow of the superheated water vapor in the apparatus main body and the flow of the exhaust gas in the pipe from the outlet of the apparatus main body to the cyclone collector function as a transferring fluid that is necessary and sufficient for transferring, into the cyclone collector, the powder product produced in the apparatus main body.

According to the present invention, the superheated water vapor is employed as a heat source for drying the atomized raw material sprayed into the apparatus main body. Accordingly, the cooling means is provided to liquefy the superheated water vapor, and thus the inside of the apparatus main body is easily kept at constant reduced pressure. In addition, the superheated water vapor has a relatively large heat capacity, and hence a heat quantity necessary for drying can be easily ensured with a relatively small quantity of gas. As a result, without increasing a size of the apparatus, it is possible to produce a relatively large quantity of powder in a short period of time.

Further, according to the present invention, the liquid raw material and the superheated water vapor are simultaneously sprayed (in a parallel state) through a single spray nozzle into the apparatus main body kept at reduced pressure. At this time, in the spray nozzle, the spray port for spraying the liquid raw material into the apparatus main body, and the spout port for spraying the superheated water vapor into the apparatus main body are close to each other, and hence the atomized raw material sprayed and produced in the apparatus main body easily undergoes heat exchange with the superheated water vapor, and the atomized raw material is dried as much as possible and reliably powdered before reaching the inner wall surface of the apparatus main body. Accordingly, the atomized raw material sprayed into the apparatus main body can be prevented as much as possible from reaching the inner wall surface of the apparatus main body while remaining as droplets, and then drying and solidifying after adhering to the inner wall surface.

Further, according to the present invention, the superheated water vapor and the liquid raw material are simultaneously sprayed (in an opposed state) respectively through the first spray nozzle and the second spray nozzle into the apparatus main body kept at reduced pressure. When the first spray nozzle and the second spray nozzle are used, the first spray nozzle and the second spray nozzle are arranged so as to be opposed to each other with a predetermined spacing. Accordingly, the atomized raw material sprayed and produced in the apparatus main body collides with and comes into contact with the superheated water vapor in the apparatus main body, and thus the atomized raw material efficiently undergoes heat exchange with the superheated water vapor. As a result, the atomized raw material in this case is dried further as much as possible and reliably powdered before reaching the inner wall surface of the apparatus main body. Therefore, even in a case where the atomized raw material sprayed into the apparatus main body may be changed in, for example, specific gravity and viscosity so that a state of the atomized raw material at the time of spraying may vary, the atomized raw material can be more reliably prevented from reaching the inner wall surface of the apparatus main body while remaining as atomized droplets, and then solidifying after adhering to the inner wall surface.

In addition, according to the present invention, in a case where the evaporator including: the spray nozzle provided on one end side thereof; and the outlet formed on another end side thereof in communication to the cooling means is adopted as the apparatus main body, and where the cyclone collector arranged between the outlet of the evaporator and the cooling means is adopted as the product collecting means, the following advantages are provided. That is, the powder product produced in the evaporator by drying and powdering can be reliably transferred in the evaporator to the outlet along with the flow of the superheated water vapor, and can be reliably transferred into the cyclone collector along with the flow of the exhaust gas flowing from the outlet of the evaporator via the cyclone collector into the cooling means. As a result, during the transfer, the powder product can be prevented as much as possible from adhering to the inner wall surface of the evaporator and to the inside of the pipe extending from the outlet of the evaporator to the cyclone collector, and the powder product can be efficiently collected in the cyclone collector after being separated into a solid and gas.

Advantageous Effects of Invention

According to the vacuum-pressure spray-drying method and the vacuum-pressure spray-drying apparatus of the present invention, it is possible to efficiently dry and powder the liquid raw material containing a substance susceptible to heat denaturation, such as a food raw material and a medicine raw material.

BRIEF DESCRIPTION OF DRAWINGS

FIG. 4(*a*) is an explanatory plan view illustrating the spray nozzle. FIG. 4(*b*) is an explanatory longitudinal sectional view taken along the line Q1-Q1 of FIG. 4(*a*). FIG. 4(*c*) is an explanatory bottom view illustrating the spray nozzle.

DESCRIPTION OF EMBODIMENTS

In the following, preferred embodiments of the present invention are described in detail with reference to the attached drawings.

First Embodiment

Figure 1:
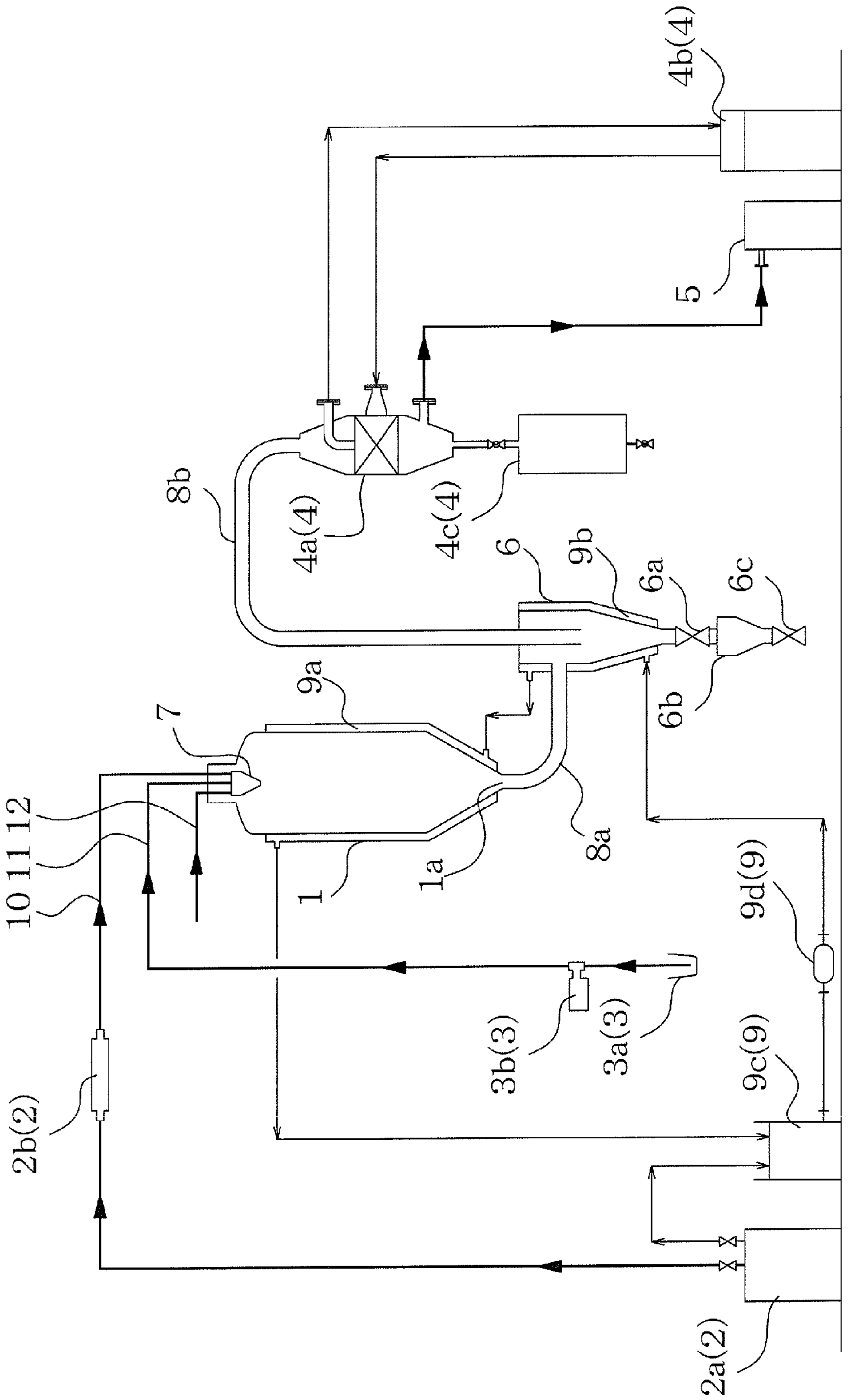
FIG. 1 is an explanatory diagram illustrating a vacuum-pressure spray-drying method and a vacuum-pressure spray-drying apparatus according to a first embodiment of the present invention.
Figure 2:
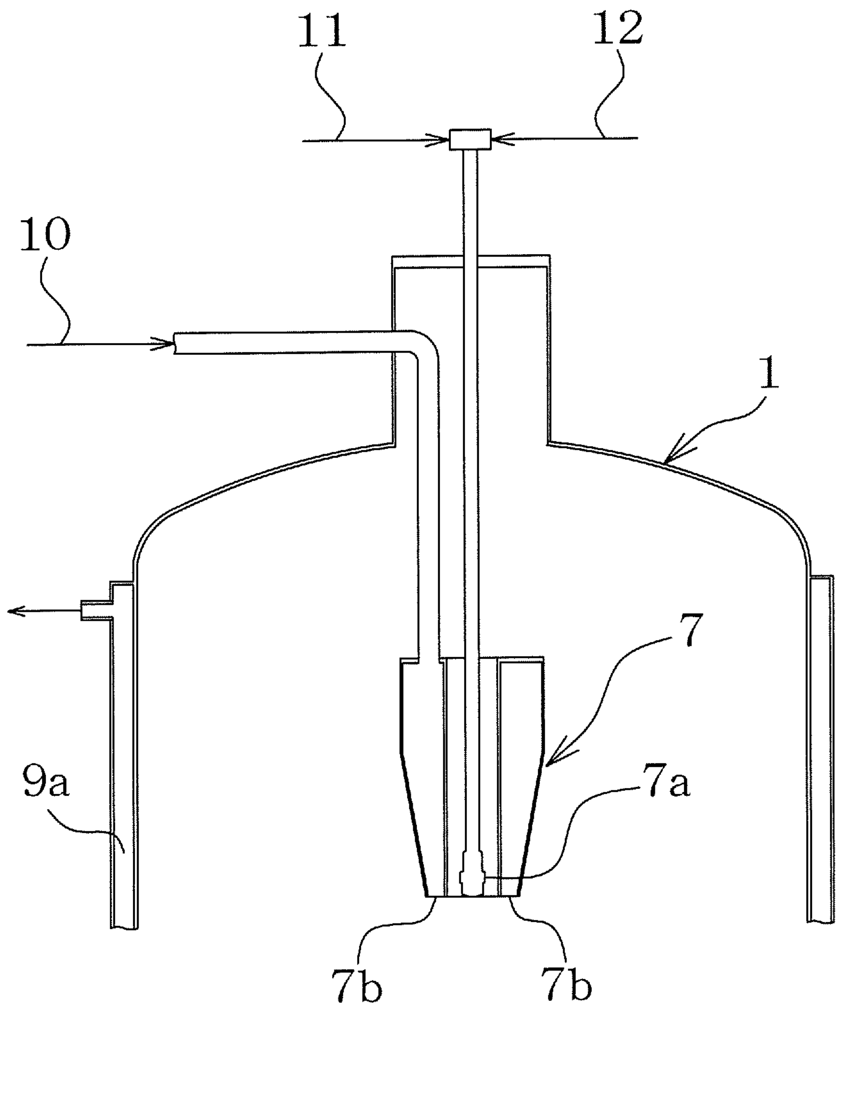
FIG. 2 is an explanatory partial longitudinal sectional view illustrating a spray nozzle of FIG. 1.

FIGS. 1 and 2 illustrate a vacuum-pressure spray-drying method and a vacuum-pressure spray-drying apparatus according to a first embodiment of the present invention.

In the first embodiment, the vacuum-pressure spray-drying apparatus includes an evaporator (apparatus main body) 1, superheated water vapor supplying means 2, liquid raw material supplying means 3, cooling means 4, a vacuum pump (pressure reducing means) 5, and a cyclone collector (product collecting means) 6.

The evaporator 1 is formed of a container that is kept at reduced pressure. The evaporator 1 includes a spray nozzle 7 formed at an upper end thereof, and an outlet 1*a* formed in a lower end thereof. The superheated water vapor supplying means 2 supplies a superheated water vapor to the spray nozzle 7, and includes a boiler 2*a* for generating a water vapor, and a heater 2*b* for heating the water vapor generated by the boiler 2*a* to change the water vapor into the superheated water vapor. The liquid raw material supplying means 3 includes a storage tank 3*a* for temporarily storing a liquid raw material, and a feeding pump 3*b* for feeding the liquid raw material. The liquid raw material supplying means 3 supplies a certain quantity of the liquid raw material from the storage tank 3*a* to the spray nozzle 7.

The cooling means 4 cools exhaust gas discharged from the outlet 1*a* of the evaporator 1, and collects condensed water generated by cooling. The cooling means 4 includes a condenser 4*a* for cooling and condensing the exhaust gas discharged from the outlet 1*a* of the evaporator 1 (mainly, superheated water vapor after undergoing heat exchange with an atomized raw material in the evaporator 1, and vapor resulting from volatilization of a solvent and a solute contained in the liquid raw material), a cooling unit 4*b* for circulating a refrigerant in and out of the condenser 4*a*, and a receiver tank 4*c* for collecting the condensed water generated by the condenser 4*a*. The vacuum pump 5 is connected to a position between the condenser 4*a* and the receiver tank 4*c* of the cooling means 4, and keeps an inside of the evaporator 1 at predetermined reduced pressure through the condenser 4*a*.

The cyclone collector 6 is arranged between the evaporator 1 and the cooling means 4, and collects a powder product which is produced in the evaporator 1 by drying and powdering and is transferred along with a flow of the exhaust gas. A pipe 8*a* having one end connected to the outlet 1*a* of the evaporator 1 is connected to a side portion of a collector main body of the cyclone collector 6. Further, a pipe 8*b* having one end connected to the condenser 4*a* is connected to an upper portion of the collector main body.

In the first embodiment, heat retaining means 9 is provided to the evaporator 1 and the cyclone collector 6. The heat retaining means 9 prevents dew condensation on an inner wall surface of the evaporator 1 and an inner wall surface of the cyclone collector 6. The heat retaining means 9 includes: hot-water circulating portions 9*a*, 9*b* for retaining heat, which are respectively provided to an outer wall surface of the evaporator 1 and an outer wall surface of the cyclone collector 6; a hot-water tank 9*c* for temporarily storing hot water fed from the boiler 2*a*; and a hot-water circulating pump 9*d* for circulating the hot water in the hot-water tank 9*c* so as to supply the hot water into the hot-water circulating portion 9*b* provided to the cyclone collector 6 and into the hot-water circulating portion 9*a* provided to the evaporator 1 in the stated order and then return the hot water into the hot-water tank 9*c*.

Further, in the first embodiment, as illustrated in FIG. 2, the spray nozzle 7 is formed into a ring-shaped nozzle, and includes: a spray port 7*a* formed at a center position thereof, for spraying the liquid raw material; and a spout port 7*b* formed around the spray port 7*a* so as to surround the spray port 7*a*, for spouting the superheated water vapor supplied from the superheated water vapor supplying means 2 via a line (pipe, etc.) 10. Similarly to a general nozzle for atomizing liquid, the spray port 7*a* of the spray nozzle 7 for spraying the liquid raw material has double structure having a discharge hole for liquid (not shown) and a discharge hole for compressed air (not shown). Through the spray port 7*a*, the liquid raw material supplied from the liquid raw material supplying means 3 via a line 11, and spraying-use compressed air supplied via a line 12 are simultaneously discharged, and thus the liquid raw material is atomized and changed into the atomized raw material.

In addition, in the first embodiment, a product receiver 6*b* is provided at a lower end portion of the cyclone collector 6 through the intermediation of a switching valve 6*a*. Further, an open/close valve 6*c* through which the powder product is taken out of the product receiver 6*b* is provided at a lower end of the product receiver 6*b*. The switching valve 6*a* is closed and the open/close valve 6*c* is opened, and thus, without destabilizing a reduced pressure condition of an inside of the cyclone collector 6, the cyclone collector 6 allows the powder product collected in the product receiver 6*b* to be taken out of the product receiver 6*b*. This enables continuous running of the vacuum-pressure spray-drying apparatus according to the first embodiment.

In the following, description is made of vacuum-pressure spray-drying operations performed by the vacuum-pressure spray-drying apparatus according to the first embodiment.

First, together with the superheated water vapor supplied from the superheated water vapor supplying means 2, the liquid raw material supplied from the liquid raw material supplying means 3 enters the spray nozzle 7 of the evaporator 1 so as to be atomized, and is sprayed from the spray port 7*a* of the spray nozzle 7 as the atomized raw material. Subsequently, along with a flow of the superheated water vapor spouted from the spout port 7*b* of the spray nozzle 7, the atomized raw material is transferred in the evaporator 1 toward the outlet 1*a* while undergoing heat exchange with the superheated water vapor, and is dried and powdered within a period in which the atomized raw material reaches the outlet 1*a*. In this manner, the liquid raw material is changed into the powder product.

Then, along with a flow of the exhaust gas discharged from the evaporator 1 into the cyclone collector 6, the powder product produced in the evaporator 1 is transferred from the outlet 1*a* of the evaporator 1 via the pipe 8*a* into the cyclone collector 6, and then is separated into a solid and gas in the cyclone collector 6. The solid is passed through the switching valve 6*a* and collected in the product receiver 6*b* as the powder product.

Further, the exhaust gas separated into a solid and gas in the cyclone collector 6 is transferred via the pipe 8*b* into the cooling means 4, and then is sucked into the condenser 4*a* of the cooling means 4. A heat exchanger in the condenser 4*a* performs heat exchange between the exhaust gas and a refrigerant that is circulated from the cooling unit 4*b*. The condensed water generated at this time is stored in the receiver tank 4*c*.

During the above-mentioned operations, the vacuum pump (pressure reducing means) 5 keeps the inside of the evaporator 1 and the inside of the cyclone collector 6 at predetermined reduced pressure through the condenser 4*a* of the cooling means 4. However, the superheated water vapor after the heat exchange and the vapor resulting from volatilization of the liquid raw material, which are contained in the exhaust gas, are condensed by the condenser 4*a* and are collected in the receiver tank 4*c*. This can alleviate a load that is applied on the vacuum pump 5 when keeping the inside of the evaporator 1 at a predetermined degree of vacuum.

Second Embodiment

Figure 3:
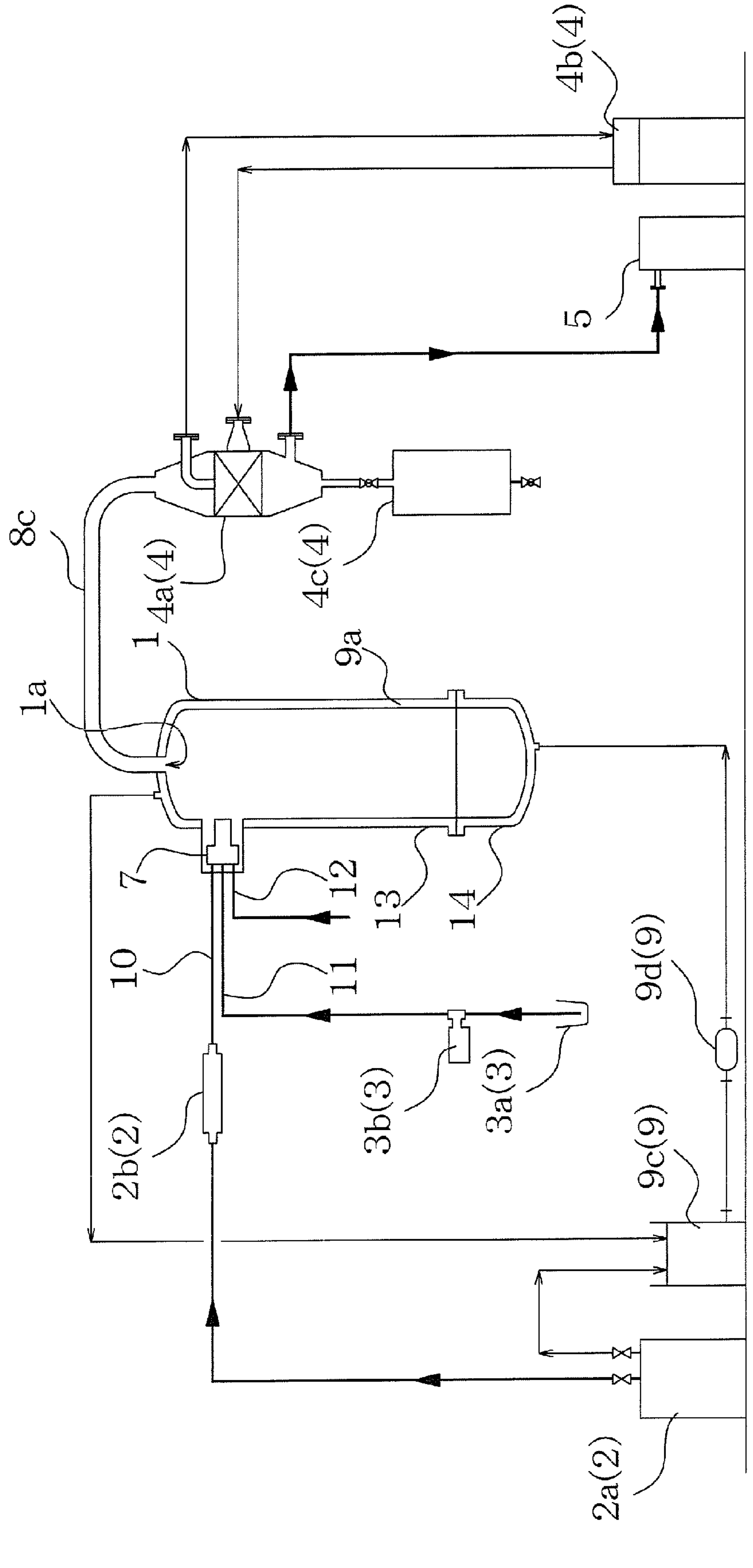
FIG. 3 is an explanatory diagram corresponding to FIG. 1, for illustrating a vacuum-pressure spray-drying method and a vacuum-pressure spray-drying apparatus according to a second embodiment of the present invention.
Figure 4:
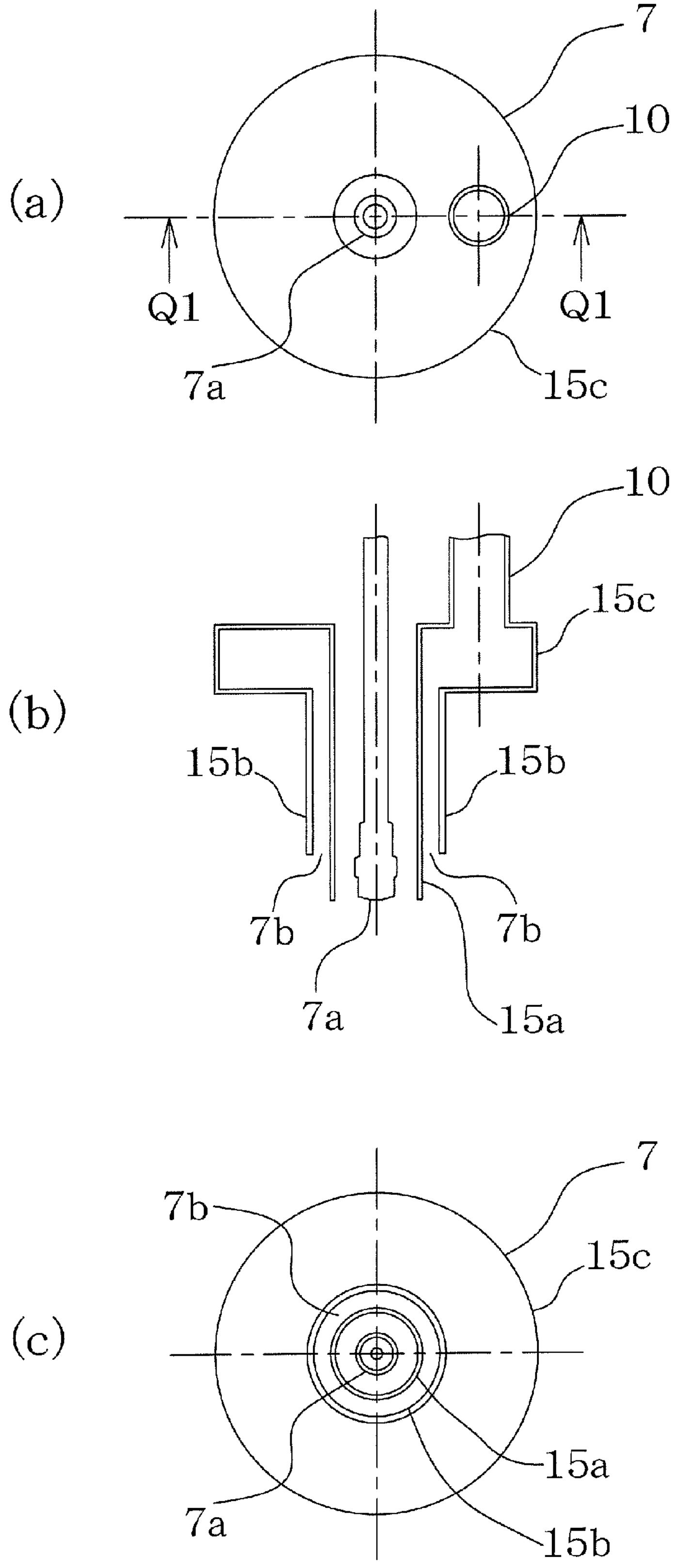
FIG. 4 are explanatory diagrams illustrating a spout port formed in a spray nozzle for use in the apparatus of FIG. 3, for spouting a superheated water vapor.

FIGS. 3 and 4 illustrate a vacuum-pressure spray-drying method and a vacuum-pressure spray-drying apparatus according to a second embodiment of the present invention.

Unlike the above-mentioned first embodiment, the second embodiment uses, as the apparatus main body, the evaporator 1 in which a heat exchanging section 13 as an upper part and a product collecting section 14 as a lower part are separably coupled together.

The spray nozzle 7 for supplying the liquid raw material and the superheated water vapor from a side of the heat exchanging section 13 in an inner peripheral direction of an inner wall surface of the heat exchanging section is provided to a side wall of an upper portion of the heat exchanging section 13. Further, at an upper end portion of the heat exchanging section 13, the outlet 1*a* for discharging the exhaust gas is formed. Further, a pipe 8*c* for directly transferring the exhaust gas into the cooling means 4 is provided to extend from the outlet 1*a* of the heat exchanging section 13. In addition, the product collecting section 14 is arranged below the heat exchanging section 13, and collects the powder product that is dried and powdered in the heat exchanging section 13.

Similarly to the above-mentioned first embodiment, the spray nozzle 7 according to the second embodiment is formed into a ring-shaped nozzle, and includes: the spray port 7*a* situated at a center thereof, for spraying the liquid raw material; and the spout port 7*b* situated around the spray port 7*a*, for spouting the superheated water vapor.

As illustrated in FIGS. 4(*a*) to 4(*c*), the spout port 7*b* of the spray nozzle 7 includes: an inner cylinder 15*a* having both open ends; an outer cylinder 15*b* arranged so as to surround an outer periphery of the inner cylinder 15*a* while keeping a predetermined clearance (spout port 7*b* for the superheated water vapor); and a pressure relief chamber 15*c* formed at an upper end portion of the outer cylinder 15*b* so as to surround an upper outer surface of the inner cylinder 15*a*, for equalizing pressure of the superheated water vapor supplied from an outside and for feeding the superheated water vapor into the above-mentioned clearance (spout port 7*b* for the superheated water vapor).

Further, the spout port 7*b* is formed so that a tip of the inner cylinder 15*a* protrudes ahead of a tip of the outer cylinder 15*b*. With this configuration, in the spout port 7*b*, an outer peripheral surface of the inner cylinder 15*a* guides a spouting direction of the superheated water vapor spouted through the above-mentioned clearance (spout port 7*b* for the superheated water vapor), and hence the superheated water vapor, which is spouted from the spout port 7*b* formed by the above-mentioned clearance, is not immediately diffused beyond the tip of the inner cylinder 15*a* toward a center axis of the inner cylinder 15*a*.

In the vacuum-pressure spray-drying apparatus according to the second embodiment, in the upper portion of the evaporator 1 having a circular horizontal cross-section, the spray nozzle 7 is arranged so that a spraying direction of the nozzle 7 extends along a circumferential direction of the inner wall surface of the evaporator 1. Accordingly, the atomized raw material and the superheated water vapor, which are simultaneously sprayed through the spray nozzle 7 into the evaporator 1, are spouted under a state in which the superheated water vapor covers the atomized raw material directly after the spraying. When the superheated water vapor and the atomized raw material are diffused in the apparatus main body 1, the atomized raw material is dried and powdered by efficiently undergoing heat exchange with the superheated water vapor before reaching the inner wall surface of the evaporator 1.

Third Embodiment

Figure 5:
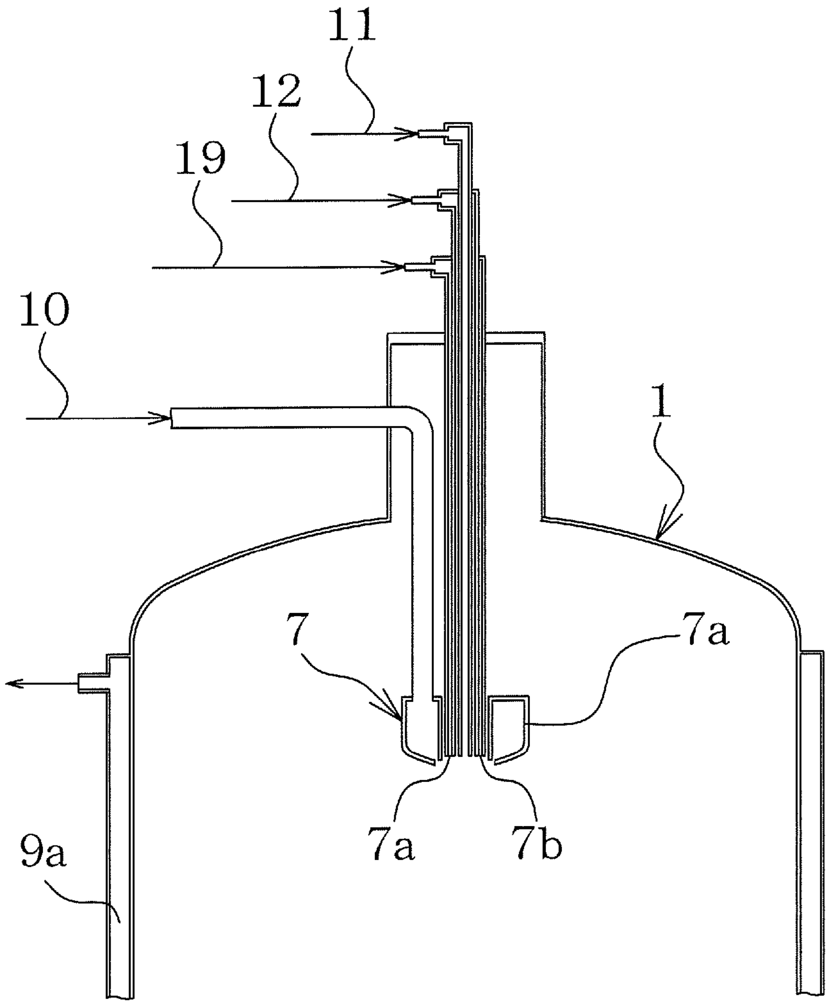
FIG. 5 is an explanatory partial longitudinal sectional view illustrating a spray nozzle adopted in a vacuum-pressure spray-drying method and a vacuum-pressure spray-drying apparatus according to a third embodiment of the present invention.
Figure 6:
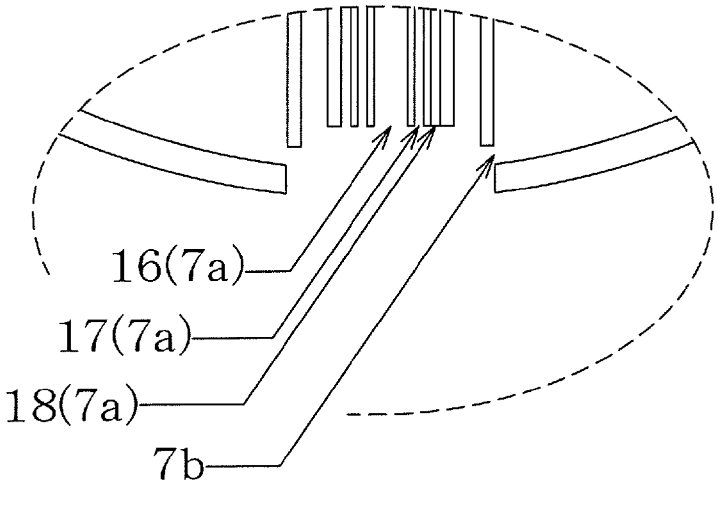
FIG. 6 is an explanatory partial enlarged sectional view illustrating a main part of FIG. 5.

FIGS. 5 and 6 illustrate a vacuum-pressure spray-drying method and a part of a vacuum-pressure spray-drying apparatus according to a third embodiment of the present invention.

Unlike the above-mentioned first embodiment, the third embodiment adopts the following configuration as the spray nozzle 7.

That is, in the spray nozzle 7 according to the third embodiment, the spray port 7*a*, which is arranged at the center position of the spray nozzle 7, for spraying the liquid raw material, includes: a liquid raw material discharge hole 16 situated in a center portion thereof, for discharging the liquid raw material; an air discharge hole 17 situated on an outer side of the liquid raw material discharge hole 16 to surround the liquid raw material discharge hole 16 in a ring-shaped manner, for discharging heat-insulating air; and a saturated vapor discharge hole 18 situated on an outer side of the air discharge hole 17 to surround the air discharge hole 17 in a ring-shaped manner, for discharging a spraying-use saturated vapor, Further, in the spray nozzle 7, the spout port 7*b* for the superheated water vapor, which is situated in a periphery of the spray port 7*a* for the liquid raw material, is formed so as to be situated on the outer side of the spray port 7*a* and to surround the saturated vapor discharge hole 18 in a ring-shaped manner. In this way, the so-called ring-shaped spray nozzle 7 is formed.

Note that, in FIG. 5, reference numeral 10 denotes a line for supplying the superheated water vapor to the spout port 7*b* of the spray nozzle 7, and reference numeral 11 denotes a line for supplying the liquid raw material to the liquid raw material discharge hole 16 forming the spray port 7*a* of the spray nozzle 7. Further, reference numeral 12 denotes a line for supplying the heat-insulating air to the air discharge hole 17 forming the spray port 7*a* of the spray nozzle 7, and reference numeral 19 denotes a line for supplying the spraying-use saturated vapor to the saturated vapor discharge hole 18 forming the spray port 7*a* of the spray nozzle 7.

In the vacuum-pressure spray-drying apparatus using the spray nozzle 7 according to the third embodiment, the liquid raw material, which is sprayed from the liquid raw material discharge hole 16 formed in the center portion of the spray nozzle 7, is insulated from heating due to the heat-insulating air discharged from the air discharge hole 17, and is efficiently atomized due to the spraying-use saturated vapor discharged from the saturated vapor discharge hole 18. Further, similarly to the above-mentioned first embodiment, in the evaporator 1, the atomized raw material produced by atomizing the liquid raw material more efficiently comes into contact with the superheated water vapor spouted from the spout port 7*b* surrounding the saturated vapor discharge hole 18, and thus efficiently undergoes heat exchange with the superheated water vapor. In this manner, the atomized raw material is reliably dried and powdered before reaching the inner wall surface of the evaporator 1.

Test Example 1

First, 47 parts by weight of distilled water and 21 parts by weight of non-fat dry milk powder were added to 32 parts by weight of commercially-available plain yogurt, and all were mixed together homogeneously, to thereby prepare a fermented milk slurry having a solid content concentration of 30 wt % as a liquid raw material.

Using the vacuum-pressure spray-drying apparatus according to the first embodiment illustrated in FIGS. 1 and 2, vacuum-pressure spray-drying was performed on the fermented milk slurry under the following operation conditions: a rate of feeding the fermented milk slurry by the spray nozzle was set to 1.2 L/hr; a rate of feeding compressed air, 35 NL/min; a rate of feeding superheated water vapor, 40 kg/hr; a vapor temperature of the superheated water vapor, 170° C.; a degree of vacuum of an inside of an evaporator, 4 to 5 kPa; a temperature when performing drying in the evaporator, 65 to 78° C.; and a heat retaining temperature of the evaporator and a cyclone collector, 40 to 45° C. As a result, powdered milk containing lactic acid bacteria and having a moisture content of 5 to 6 wt % was produced in a yield of 82.5 wt %.

Regarding the powdered milk containing lactic acid bacteria and produced as described above, a change in the number of lactic acid bacteria between the powdered milk containing lactic acid bacteria as a powder product and the fermented milk slurry prepared as the liquid raw material was examined by an agar plate method as a pour plate method. The results of examination are as follows. The fermented milk slurry contained $3.3\times10^{11}$ CFU/g-TS of lactic acid bacteria, whereas the powdered milk containing lactic acid bacteria contained $1.6\times10^{11}$ CFU/g-TS of lactic acid bacteria. That is, a percentage of retention of lactic acid bacteria after drying was about 50%.

Further, after completion of production of the powdered milk containing lactic acid bacteria, a state of adhesion of dried powder to the evaporator, the cyclone collector, and pipes provided between the evaporator and the cyclone collector was visually examined. As a result, only slight adhesion of dried powder to each component was confirmed, and hence it was found that the vacuum-pressure spray-drying apparatus according to the present invention was satisfactorily operable.

Fourth Embodiment

Figure 7:
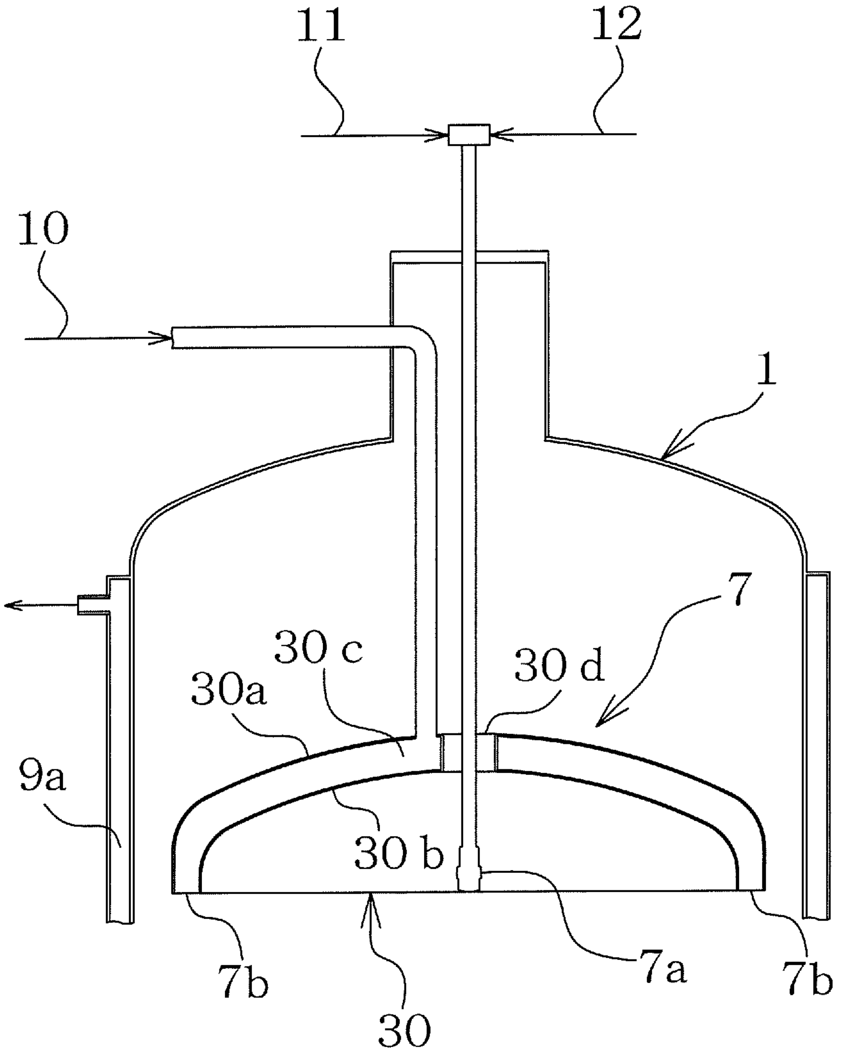
FIG. 7 is an explanatory partial longitudinal sectional view illustrating a spray nozzle adopted in a vacuum-pressure spray-drying method and a vacuum-pressure spray-drying apparatus according to a fourth embodiment of the present invention.

FIG. 7 illustrates a vacuum-pressure spray-drying method and a part of a vacuum-pressure spray-drying apparatus according to a fourth embodiment of the present invention.

Unlike the above-mentioned first embodiment, the fourth embodiment adopts the following configuration as the spray nozzle 7.

That is, the spray nozzle 7 according to the fourth embodiment includes: the spray port 7*a* arranged at a center position thereof, for spraying the liquid raw material; and the spout port 7*b* arranged around the spray port 7*a*, for spouting the superheated water vapor. In particular, the spout port 7*b* for the superheated water vapor is formed at a distance from the spray port 7*a* for the liquid raw material. In the spray nozzle 7, a flow rate adjusting body 30 includes: a circular-dome-shaped outer plate member 30*a* arranged close to the inner wall of the evaporator 1; and an inner plate member 30*b* which has a shape substantially similar to that of the outer plate member 30*a* and is arranged on an inner side of the outer plate member 30*a* with a predetermined spacing so as to form a flow path (clearance) 30*c* for the superheated water vapor, and the spout port 7*b* for the superheated water vapor is formed as a ring-shaped opening portion defined by a lower end portion of the outer plate member 30*a* and a lower end portion of the inner plate member 30*b* which are present on a lower end side of the flow rate adjusting body 30. The flow path of the flow rate adjusting body 30 is formed and enclosed by an inner surface of the outer plate member 30*a* and an outer surface of the inner plate member 30*b*, and substantially a center portion of an upper portion of the flow rate adjusting body 30 is connected to a pipe of the line 10. On the other hand, the spray port 7*a* for the liquid raw material is connected to a pipe of the line 11 and a pipe of the line 12 via a pipe which is arranged through a through-hole 30*d* formed in substantially the center portion of the upper portion of the flow rate adjusting body 30. The spray port 7*a* is formed as a spout port of a two fluid nozzle for jetting the liquid raw material and the heat-insulating air.

In the vacuum-pressure spray-drying apparatus using the spray nozzle 7 according to the fourth embodiment, the superheated water vapor, which is supplied from the line 10, passes through the flow path 30*c* of the flow rate adjusting body 30 of the spray nozzle 7, and thus is adjusted at an appropriate flow rate. In this state, the superheated water vapor is jetted from the ring-shaped spout port 7*b*. The superheated water vapor jetted from the spout port 7*b* of the spray nozzle 7 moves downward along the inner wall of the evaporator 1. On the other hand, the liquid raw material jetted from the spray port 7*a* formed in the center portion of the spray nozzle 7 is atomized while being insulated from heating due to the heat-insulating air. The flow rate of the superheated water vapor can be adjusted by, for example, changing a height dimension or the like of the flow path 30*c* of the flow rate adjusting body 30.

In the evaporator 1, the atomized raw material produced by atomizing the liquid raw material efficiently comes into contact with the superheated water vapor jetted in the above-mentioned manner from the ring-shaped spout port 7*b* formed at a distance from the spray port 7*a* for the liquid raw material, and thus efficiently undergoes heat exchange with the superheated water vapor. In this manner, the atomized raw material is reliably dried and powdered before reaching the inner wall surface of the evaporator 1. Further, the atomized raw material or the powder product, which tends to move in a direction of reaching the inner wall surface of the evaporator 1, is prevented from adhering to the inner wall surface due to the flow of the superheated water vapor that moves downward along the inner wall surface of the evaporator 1.

Particularly in the vacuum-pressure spray-drying apparatus using the spray nozzle 7, for example, even in a case where a liquid raw material containing a volatile component such as alcohol having a boiling point lower than that of water is applied as the liquid raw material, the liquid raw material can be satisfactorily dried in the evaporator 1 by the superheated water vapor jetted from the spout port 7*b* of the spray nozzle 7. Further, the powder product obtained by drying and powdering the liquid raw material does not adhere to the inner wall surface of the evaporator 1. In addition, the powder product is not degenerated by heat.

Fifth Embodiment

Figure 8:
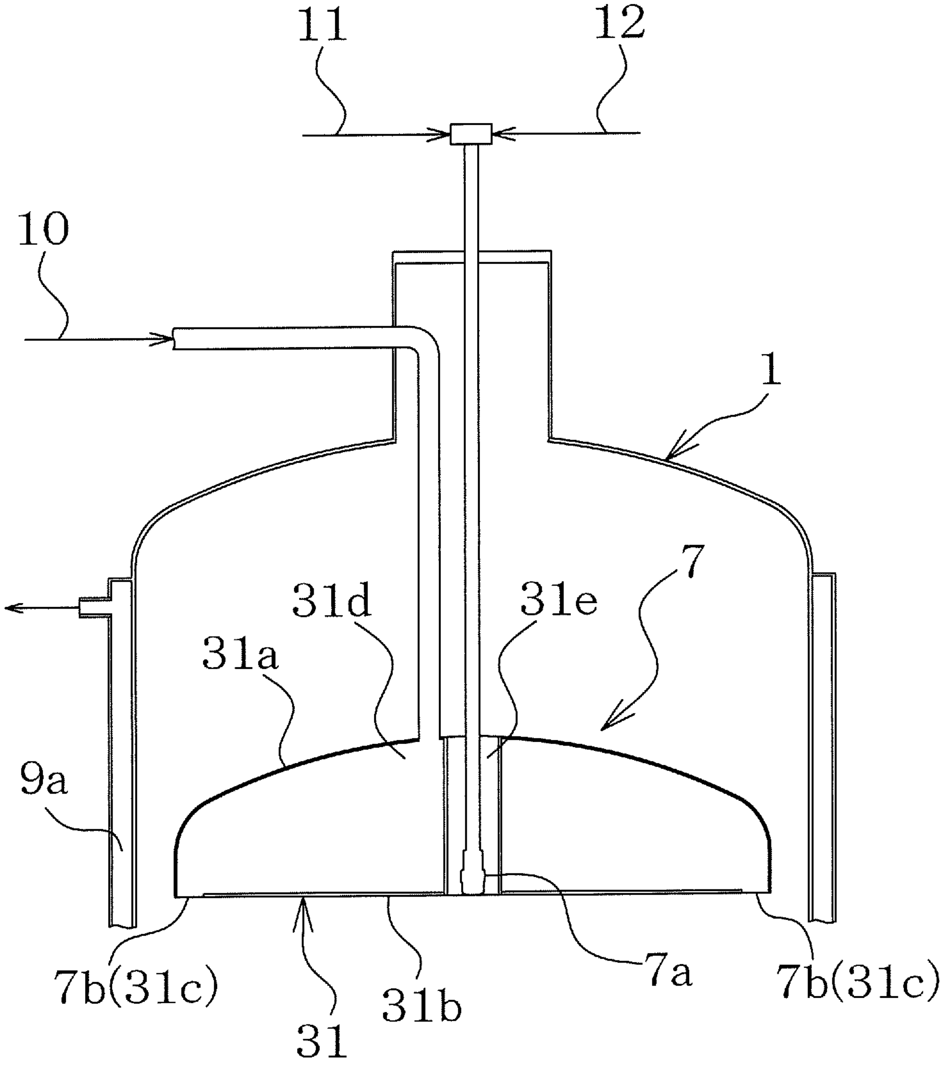
FIG. 8 is an explanatory partial longitudinal sectional view illustrating a spray nozzle adopted in a reduced-pressure spray-drying method and a vacuum-pressure spray-drying apparatus according to a fifth embodiment of the present invention.

FIG. 8 illustrates a vacuum-pressure spray-drying method and a part of a vacuum-pressure spray-drying apparatus according to a fifth embodiment of the present invention.

Unlike the above-mentioned first embodiment (fourth embodiment), the fifth embodiment adopts the following configuration as the spray nozzle 7.

That is, the spray nozzle 7 according to the fifth embodiment includes: the spray port 7*a* arranged at a center position thereof, for spraying the liquid raw material; and the spout port 7*b* arranged around the spray port 7*a*, for spouting the superheated water vapor. In particular, substantially similarly to the case of the spray nozzle 7 according to the fourth embodiment, the spout port 7*b* for the superheated water vapor is formed at a distance from the spray port 7*a* for the liquid raw material. In the spray nozzle 7, a flow rate adjusting body 31 includes: a circular-dome-shaped outer plate member 31*a* arranged close to the inner wall of the evaporator 1; and a circular flat plate 31*b* which is arranged on an inner side of a lower circular opening portion of the outer plate member 31*a* in a non-contact state so as to form a predetermined clearance 31*c*, and the spout port 7*b* for the superheated water vapor is formed as a ring-shaped opening portion defined by a lower end portion of the outer plate member 31*a* and an outer peripheral portion of the circular flat plate 31*b* which are present on a lower end side of the flow rate adjusting body 31. The flow rate adjusting body 31 includes a space 31*d* enclosed by an inner wall surface of the outer plate member 31*a* and the circular flat plate 31*b*. Further, the space 31*d* is connected to a pipe of the line 10 at substantially a center portion of an upper portion of the flow rate adjusting body 31. On the other hand, the spray port 7*a* for the liquid raw material is connected to a pipe of the line 11 and a pipe of the line 12 via a pipe which is arranged through a through-hole 31*e* formed in substantially the center portion of the upper portion of the flow rate adjusting body 31. Further, the spray port 7*a* is formed as a spout port of a two fluid nozzle for jetting the liquid raw material and the heat-insulating air.

In the vacuum-pressure spray-drying apparatus using the spray nozzle 7 according to the fifth embodiment, the superheated water vapor, which is supplied from the line 10, diffuses in and passes through the space 31*d* having a large volume and formed in the flow rate adjusting body 31 of the spray nozzle 7, and thus is adjusted at an appropriate flow rate and equalized in pressure. In this state, the superheated water vapor is jetted from the ring-shaped spout port 7*b*. The superheated water vapor jetted from the spout port 7*b* of the spray nozzle 7 moves downward along the inner wall of the evaporator 1. On the other hand, the liquid raw material jetted from the spray port 7*a* formed in the center portion of the spray nozzle 7 is atomized while being insulated from heating due to the heat-insulating air. The flow rate of the superheated water vapor can be adjusted by, for example, changing a width of the clearance 31*c*, a volume of the space 31*d*, and the like of the flow rate adjusting body 31.

In the evaporator 1, the atomized raw material produced by atomizing the liquid raw material efficiently comes into contact with the superheated water vapor jetted in the above-mentioned manner from the ring-shaped spout port 7*b* formed at a distance from the spray port 7*a* for the liquid raw material, and thus efficiently undergoes heat exchange with the superheated water vapor. In this manner, the atomized raw material is reliably dried and powdered before reaching the inner wall surface of the evaporator 1. Further, the atomized raw material or the powder product, which tends to move in a direction of reaching the inner wall surface of the evaporator 1, is prevented from adhering to the inner wall surface due to the flow of the superheated water vapor that moves downward along the inner wall surface of the evaporator 1.

In particular, also in the vacuum-pressure spray-drying apparatus using the spray nozzle 7, for example, even in a case where a liquid raw material containing a volatile component such as alcohol having a boiling point lower than that of water is applied as the liquid raw material, substantially similarly to the fourth embodiment, the liquid raw material can be satisfactorily dried in the evaporator 1 by the superheated water vapor jetted from the spout port 7*b* of the spray nozzle 7. Further, the powder product obtained by drying and powdering the liquid raw material does not adhere to the inner wall surface of the evaporator 1. In addition, the powder product is not degenerated by heat.

Sixth Embodiment

Figure 9:
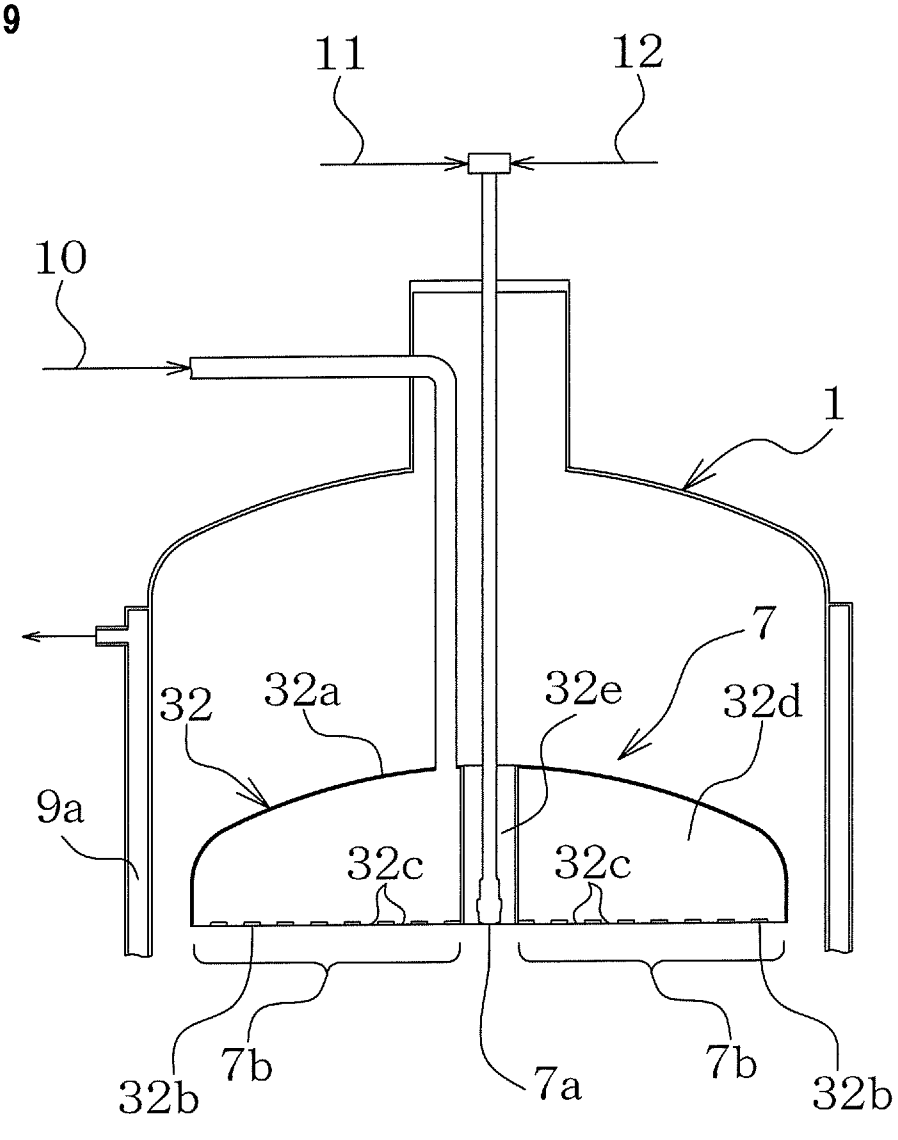
FIG. 9 is an explanatory partial longitudinal sectional view illustrating a spray nozzle adopted in a vacuum-pressure spray-drying method and a vacuum-pressure spray-drying apparatus according to a sixth embodiment of the present invention.

FIG. 9 illustrates a vacuum-pressure spray-drying method and a part of a vacuum-pressure spray-drying apparatus according to a sixth embodiment of the present invention.

Unlike the above-mentioned first embodiment, the sixth embodiment adopts the following configuration as the spray nozzle 7.

That is, the spray nozzle 7 according to the sixth embodiment includes: the spray port 7*a* arranged at a center position thereof, for spraying the liquid raw material; and the spout ports 7*b* arranged around the spray port 7*a*, for spouting the superheated water vapor. In particular, the spout ports 7*b* for the superheated water vapor are formed around the spray port 7*a* in a dotted manner. In the spray nozzle 7, a flow rate adjusting body 32 includes: a circular-dome-shaped outer plate member 32*a* arranged close to the inner wall of the evaporator 1; and a circular flat plate 32*b* which closes a lower circular opening portion of the outer plate member 32*a* and has a plurality of discharge holes 32*c* formed at predetermined intervals so as to pass through the circular flat plate 32*b*, and the spout ports 7*b* for the superheated water vapor are formed as dotted opening portions by the plurality of discharge holes 32*c* formed in the circular flat plate 32*b* of the flow rate adjusting body 32. Also the flow rate adjusting body 32 includes a space 32*d* enclosed by an inner wall surface of the outer plate member 32*a* and the circular flat plate 32*b*. Further, the space 32*d* is connected to a pipe of the line 10 at substantially a center portion of an upper portion of the flow rate adjusting body 32. On the other hand, the spray port 7*a* for the liquid raw material is connected to a pipe of the line 11 and a pipe of the line 12 via a pipe which is arranged through a through-hole 32*e* formed in substantially the center portion of the upper portion of the flow rate adjusting body 32. Further the spray port 7*a* is formed as a spout port of a two fluid nozzle for jetting the liquid raw material and the heat-insulating air.

In the vacuum-pressure spray-drying apparatus using the spray nozzle 7 according to the sixth embodiment, the superheated water vapor, which is supplied from the line 10, passes through the space 32*d* of the flow rate adjusting body 32 of the spray nozzle 7 and is distributed to pass through the plurality of discharge holes 32*c*. Thus, the superheated water vapor is adjusted at an appropriate flow rate and dispersed widely. In this state, the superheated water vapor is jetted from the spout ports 7*b*. On the other hand, the liquid raw material jetted from the spray port 7*a* formed in the center portion of the spray nozzle 7 is atomized while being insulated from heating due to the heat-insulating air. The flow rate of the superheated water vapor can be adjusted by, for example, changing the opening area and the number of the discharge holes 32*c*, a volume of the space 32*d*, and the like of the flow rate adjusting body 32.

In the evaporator 1, the atomized raw material produced by atomizing the liquid raw material efficiently comes into contact with the superheated water vapor jetted in the above-mentioned manner from the spout ports 7*b* formed in a dotted manner around the spray port 7*a* for the liquid raw material, and thus efficiently undergoes heat exchange with the superheated water vapor. In this manner, the atomized raw material is reliably dried and powdered before reaching the inner wall surface of the evaporator 1.

Particularly in the vacuum-pressure spray-drying apparatus using the spray nozzle 7, for example, even in a case where a liquid raw material containing a volatile component such as alcohol having a boiling point lower than that of water is applied as the liquid raw material, substantially similarly to the fourth embodiment, the liquid raw material can be satisfactorily dried in the evaporator 1 by the superheated water vapor jetted from the spout ports 7*b* of the spray nozzle 7. Further, the powder product obtained by drying and powdering the liquid raw material does not adhere to the inner wall surface of the evaporator 1. In addition, the powder product is not degenerated by heat.

Seventh Embodiment

Figure 10:
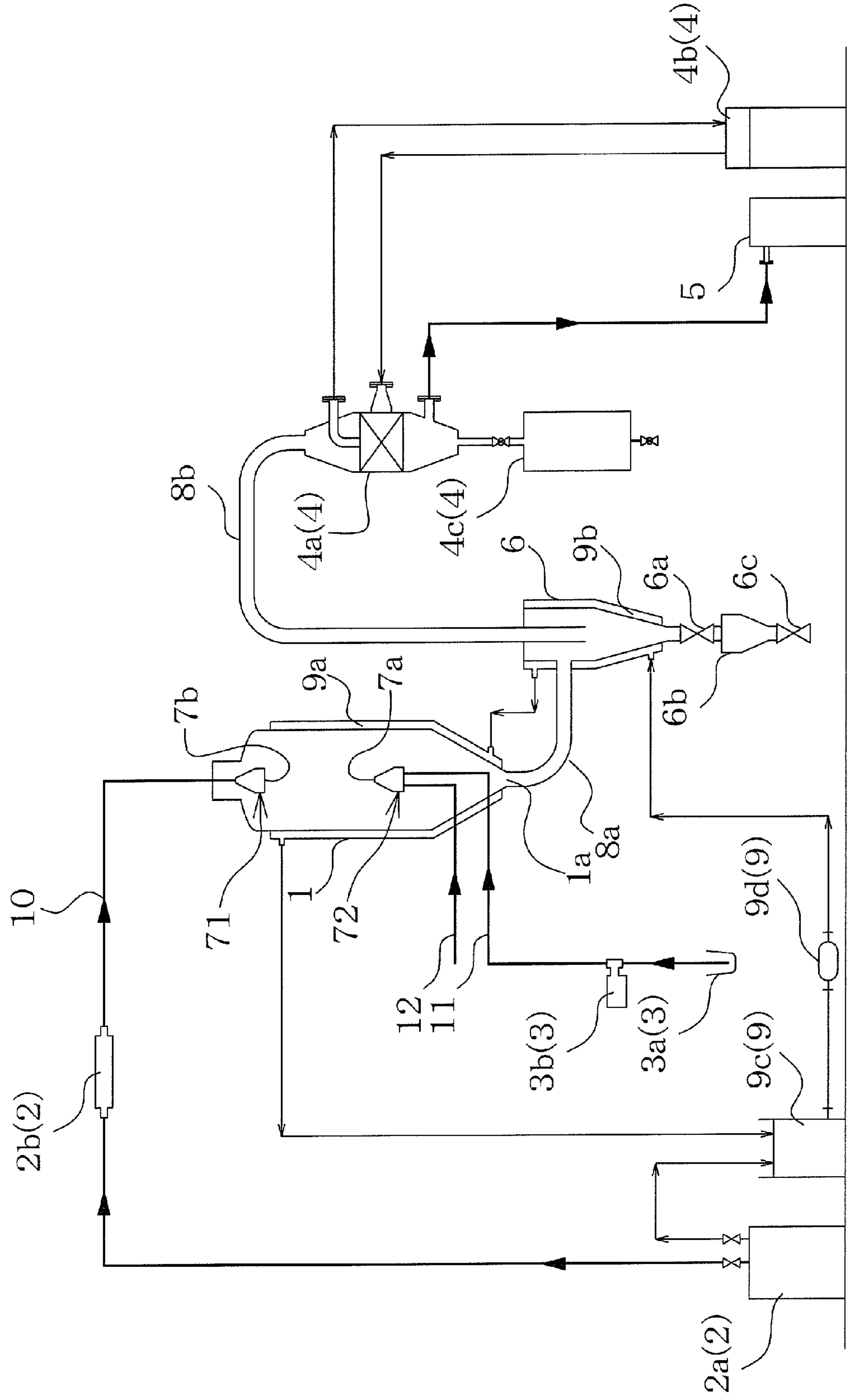
FIG. 10 is an explanatory diagram illustrating a vacuum-pressure spray-drying method and a vacuum-pressure spray-drying apparatus according to a seventh embodiment of the present invention.

FIG. 10 illustrates a vacuum-pressure spray-drying method and a vacuum-pressure spray-drying apparatus according to a seventh embodiment of the present invention.

In the seventh embodiment, unlike the above-mentioned first embodiment, the following spray nozzle is used. Specifically, the spray nozzle includes: a first spray nozzle 71 including the spout port 7*b* for the superheated water vapor; and a second spray nozzle 72 including the spray port 7*a* for the liquid raw material and arranged so as to be opposed to the first spray nozzle 71 with a spacing.

The first spray nozzle 71 is arranged on the upper end side of the evaporator 1, and the spout port 7*b* for the superheated water vapor is fixed to face the lower end side of the evaporator 1. As the spout port 7*b* according to the seventh embodiment, the same configuration of the spout port (s) 7*b* of any one of the nozzles 7 illustrated in FIGS. 2, 4, and 7 to 9 can be adopted, and the spout port 7*b* according to the seventh embodiment is structured by a clearance formed using a tubular structure, a plate-like structure, etc. Further, the first spray nozzle 71 is connected to the line 10 through which the superheated water vapor is supplied, and the first spray nozzle 71 sprays the superheated water vapor from the spout port 7*b* toward the lower end of the evaporator 1. By the way, the first spray nozzle 71 can be structured by omitting the spray port 7*a* for the liquid raw material from each of the nozzles 7 illustrated in FIGS. 2, 4, and 7 to 9. Alternatively, the first spray nozzle 71 can be structured without omitting the spray port 7*a* for the liquid raw material from each of the nozzles 7 (in this case, the spray port 7*a* is not used). This point also applies to the first spray nozzle 71 according to an eighth embodiment of the present invention, which is described later.

The second spray nozzle 72 is arranged on the lower end side of the evaporator 1 so as to be opposed to the first spray nozzle 71 with a predetermined spacing, and the second spray nozzle 72 is fixed so that the spray port 7*a* for the liquid raw material is substantially opposed to the spout port 7*b* of the first spray nozzle 71. Further, the second spray nozzle 72 is arranged at a predetermined distance from the outlet 1*a* formed on the lower end side of the evaporator 1. In addition, regarding the second spray nozzle 72, the spray port 7*a* of the spray nozzle 7 for spraying the liquid raw material has double structure having a discharge hole for liquid (not shown) and a discharge hole for compressed air (not shown). Further, the second spray nozzle 72 is connected to the line 11 for supplying the liquid raw material and to the line 12 for supplying the spraying-use compressed air. The second spray nozzle 72 simultaneously discharges the liquid raw material and the spraying-use compressed air, and thus atomizes and changes the liquid raw material into the atomized raw material.

In the vacuum-pressure spray-drying apparatus according to the seventh embodiment, the superheated water vapor is diffused and sprayed toward the lower end of the evaporator 1 through the first spray nozzle 71 which is arranged on the upper end side of the evaporator 1. On the other hand, the liquid raw material is atomized and sprayed toward the upper end of the evaporator 1 through the second spray nozzle 72 which is arranged on the lower end side of the evaporator 1 so as to be opposed to the first spray nozzle 71 with a spacing. At this time, the superheated water vapor and the atomized raw material, which are sprayed through the spray nozzles 71, 72 into the evaporator 1 simultaneously so as to be opposed to each other, come into contact with each other so that the superheated water vapor covers the atomized raw material from above. Further, the liquid raw material is stably sprayed through the second spray nozzle 72 toward the upper end of the evaporator 1. In this manner, the atomized raw material comes into contact with the superheated water vapor uniformly and stably, and thus undergoes heat exchange with the superheated water vapor efficiently before reaching the inner wall surface of the evaporator 1. Accordingly, the atomized raw material is reliably dried and powdered.

Particularly in the vacuum-pressure spray-drying apparatus, for example, even in a case where a liquid raw material, which may be changed in specific gravity and viscosity depending on properties and a concentration of a component thereof so that a state of the liquid raw material at the time of spraying may fluctuate, is applied as the liquid raw material, the atomized raw material obtained by atomizing the liquid raw material comes into contact with the superheated water vapor in the evaporator uniformly and stably, and thus is satisfactorily dried and powdered. Further, the produced powder product is more reliably prevented from adhering to the inner wall (in particular, lower inner wall part substantially corresponding to a bottom surface having an inverted conical shape) of the evaporator, and heat degeneration of the product is more reliably prevented.

Eighth Embodiment

Figure 11:
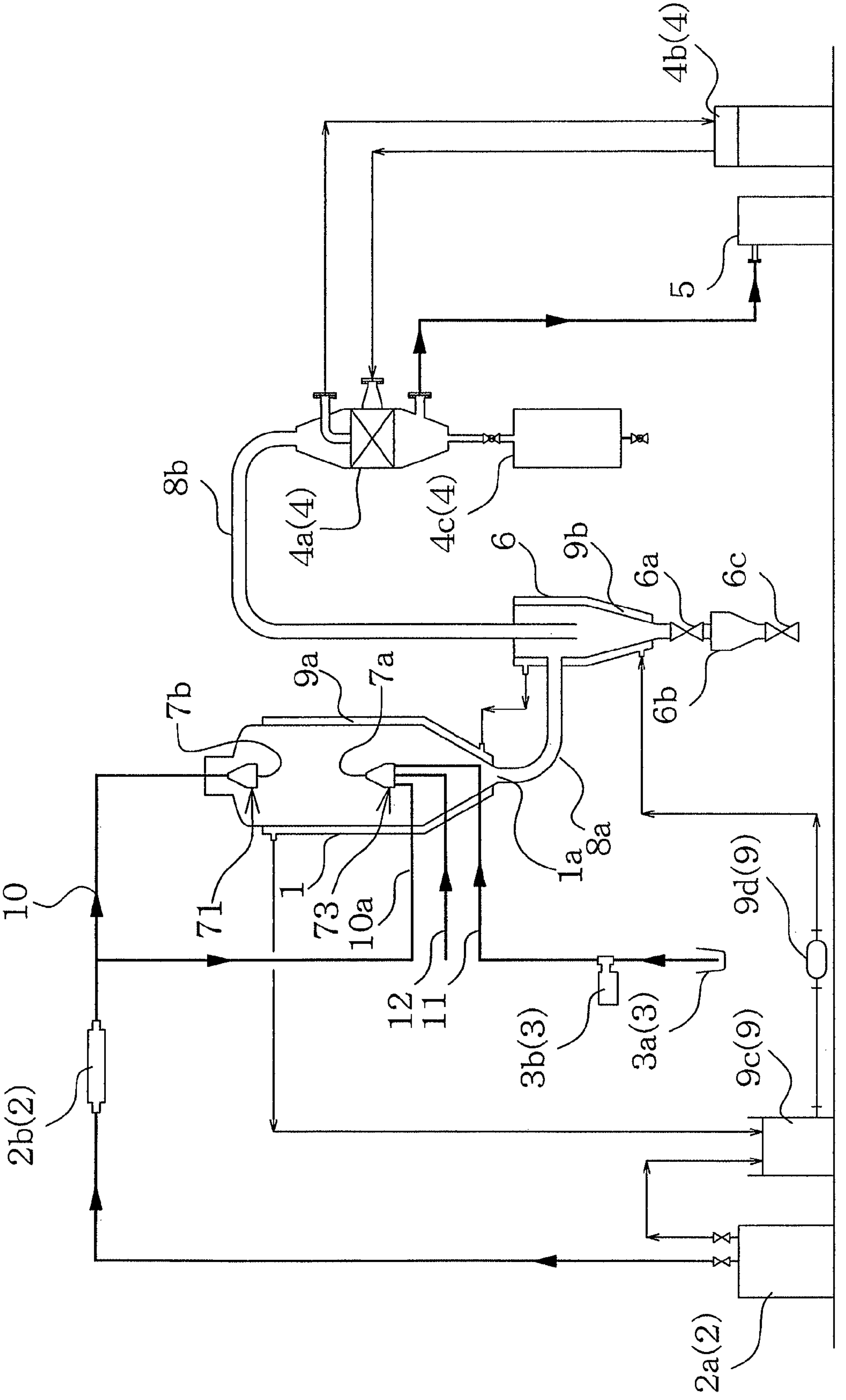
FIG. 11 is an explanatory diagram illustrating a vacuum-pressure spray-drying method and a vacuum-pressure spray-drying apparatus according to an eighth embodiment of the present invention.

FIG. 11 illustrates a vacuum-pressure spray-drying method and a vacuum-pressure spray-drying apparatus according to the eighth embodiment of the present invention.

In the eighth embodiment, unlike the above-mentioned first embodiment (seventh embodiment), the following spray nozzle is used. Specifically, the spray nozzle includes: the first spray nozzle 71 including the spout port 7*b* for the superheated water vapor; and a second spray nozzle 73 including the spray port 7*a* for the liquid raw material and the spout port 7*b* for the superheated water vapor and arranged so as to be opposed to the first spray nozzle 71 with a spacing.

The first spray nozzle 71 has a similar configuration as that of the first spray nozzle 71 according to the seventh embodiment, and is arranged on the upper end side of the evaporator 1, and the spout port 7*b* for the superheated water vapor is fixed to face the lower end side of the evaporator 1. The first spray nozzle 71 is connected to the line 10 through which the superheated water vapor is supplied, and the first spray nozzle 71 sprays a part of the superheated water vapor, which is supplied from the line 10, from the spout port 7*b* toward the lower end of the evaporator 1.

Similarly to the case of the second spray nozzle 72 according to the seventh embodiment, the second spray nozzle 73 is arranged on the lower end side of the evaporator 1 so as to be opposed to the first spray nozzle 71 with a predetermined spacing, and the second spray nozzle 73 is fixed so that the spray port 7*a* for the liquid raw material is substantially opposed to the spout port 7*b* of the first spray nozzle 71. Further, also the second spray nozzle 73 is arranged at a predetermined distance from the outlet 1*a* formed on the lower end side of the evaporator 1. In addition, substantially similarly to the case of the spray nozzle 7 according to the first embodiment, the second spray nozzle 73 is formed into a ring-shaped nozzle, and includes: the spray port 7*a* formed at a center position thereof, for spraying the liquid raw material; and the spout port 7*b* formed in a periphery of the spray port 7*a* so as to surround the spray port 7*a*, for spouting the superheated water vapor. Further, the second spray nozzle 73 is connected to the line 11 for supplying the liquid raw material and to the line 12 for supplying the spraying-use compressed air, and is further connected to the line 10 for supplying the superheated water vapor. The second spray nozzle 73 discharges the liquid raw material simultaneously with the spraying-use compressed air, and changes the liquid raw material into the atomized raw material. Further, the second spray nozzle 73 sprays the superheated water vapor simultaneously with the liquid raw material.

In the vacuum-pressure spray-drying apparatus according to the eighth embodiment, the superheated water vapor is diffused and sprayed toward the lower end of the evaporator 1 through the first spray nozzle 71 which is arranged on the upper end side of the evaporator 1. On the other hand, the liquid raw material is atomized and sprayed toward the upper end of the evaporator 1 through the second spray nozzle 73 which is arranged on the lower end side of the evaporator 1 so as to be opposed to the first spray nozzle 71 with a spacing, and also the superheated water vapor is sprayed toward the upper end of the evaporator 1. At this time, the superheated water vapor and the atomized raw material, which are sprayed through the spray nozzles 71, 73 into the evaporator 1 simultaneously so as to be opposed to each other, come into contact with each other so that the superheated water vapor covers the atomized raw material from above and below. Further, the liquid raw material is sprayed through the second spray nozzle 73 toward the upper end of the evaporator 1 stably. In this manner, a larger quantity of the atomized raw material comes into contact with the superheated water vapor uniformly and stably, and thus the atomized raw material undergoes heat exchange with the superheated water vapor more efficiently before reaching the inner wall surface of the evaporator 1. Accordingly, the atomized raw material is more reliably dried and powdered.

Also in this vacuum-pressure spray-drying apparatus, similarly to the case of the vacuum-pressure spray-drying apparatus according to the seventh embodiment, for example, even in a case where a liquid raw material, which may be changed in specific gravity and viscosity depending on properties and a concentration of a component thereof so that a state of the liquid raw material at the time of spraying may fluctuate, is applied as the liquid raw material, the atomized raw material obtained by atomizing the liquid raw material is satisfactorily dried and powdered. Further, the produced powder product is more reliably prevented from adhering to the inner wall (in particular, lower inner wall part substantially corresponding to a bottom surface having an inverted conical shape) of the evaporator, and heat degeneration of the product is more reliably prevented.

Test Example 2

Similarly to Test Example 1, 47 parts by weight of distilled water and 21 parts by weight of non-fat dry milk powder were added to 32 parts by weight of commercially-available plain yogurt, and all were mixed together homogeneously, to thereby prepare a fermented milk slurry having a solid content concentration of 30 wt % as a liquid raw material.

Using the vacuum-pressure spray-drying apparatus according to the seventh embodiment illustrated in FIG. 10, vacuum-pressure spray-drying was performed on the fermented milk slurry under the following operation conditions: a rate of feeding the fermented milk slurry by the second spray nozzle 72 was set to 2.0 L/hr; a rate of feeding compressed air, 40 NL/min; a rate of feeding a superheated water vapor by the first spray nozzle 71, 40 kg/hr; a vapor temperature of the superheated water vapor, 190° C.; a degree of vacuum of an inside of the evaporator 1, 4 to 5 kPa; a temperature when performing drying in the evaporator 1, 45 to 50° C.; and a heat retaining temperature of the evaporator 1 and the cyclone collector 6, 40 to 45° C. As a result, powdered milk containing lactic acid bacteria and having a moisture content of 5 to 6 wt % was produced in a yield of 75 wt %.

Regarding the powdered milk containing lactic acid bacteria and produced as described above, in the same way as that of Test Example 1, a change in the number of lactic acid bacteria contained in the milk was examined by an agar plate method as a pour plate method. The results of examination are as follows. The fermented milk slurry contained 1 to $6\times10^5$ CFU/g-TS of lactic acid bacteria, whereas the powdered milk containing lactic acid bacteria contained 2 to $5\times10^5$ CFU/g-TS of lactic acid bacteria. That is, it was confirmed that there was substantially no difference in the number of lactic acid bacteria before and after drying. Further, after completion of production of the powdered milk containing lactic acid bacteria, a state of adhesion of dried powder to the evaporator, the cyclone collector, and pipes provided between the evaporator and the cyclone collector was visually examined. As a result, only slight adhesion of dried powder to each component was confirmed, and hence it was found that the vacuum-pressure spray-drying apparatus according to the present invention was satisfactorily operable.

Ninth Embodiment

Figure 12:
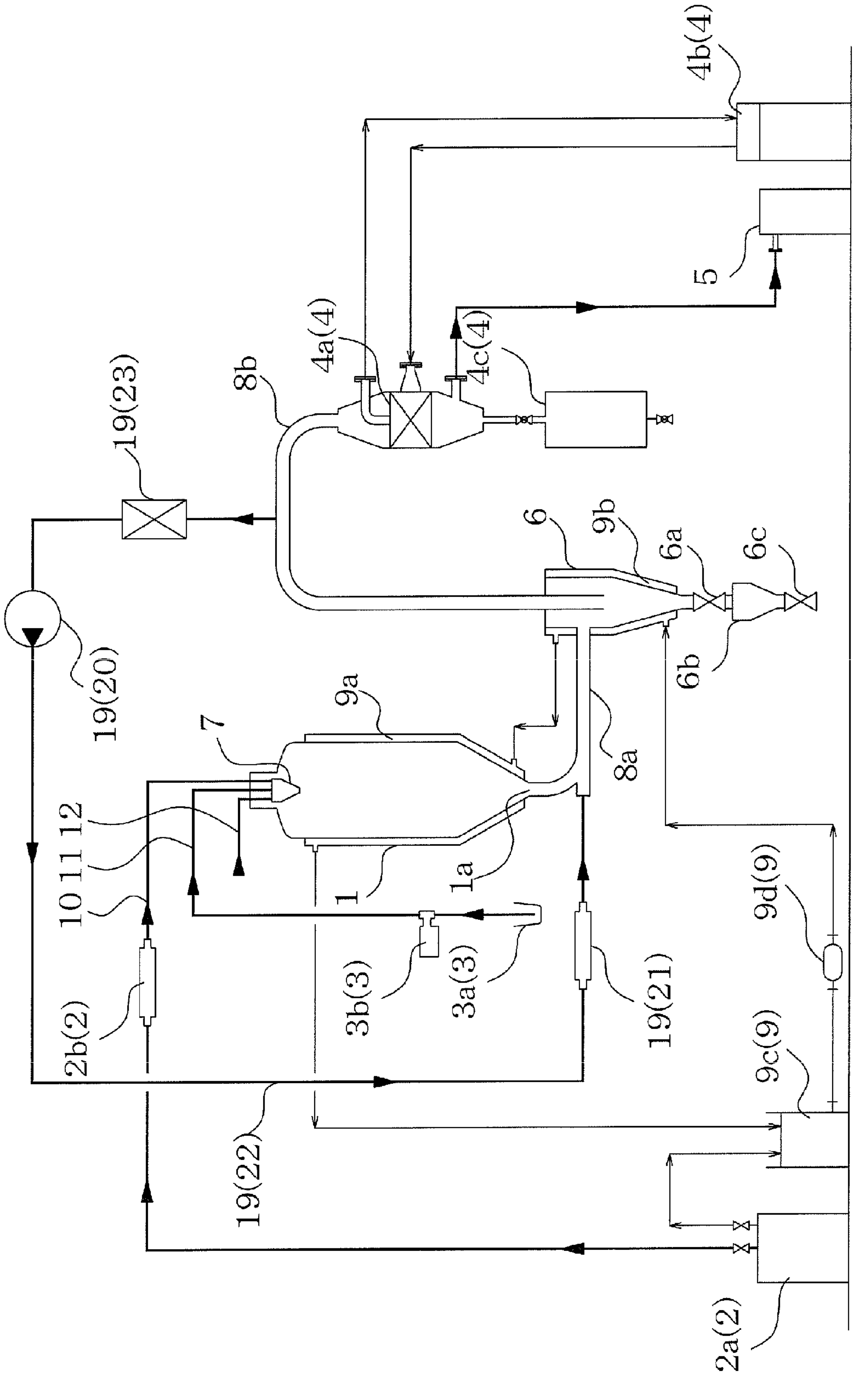
FIG. 12 is an explanatory diagram illustrating a vacuum-pressure spray-drying method and a vacuum-pressure spray-drying apparatus according to a ninth embodiment of the present invention.

FIG. 12 illustrates a vacuum-pressure spray-drying method and a vacuum-pressure spray-drying apparatus according to a ninth embodiment of the present invention.

In the ninth embodiment, unlike the above-mentioned first embodiment, there is additionally provided dry-keeping means 19 for collecting and drying a part of gas separated in the cyclone collector 6, and then introducing the part of the gas into an inside of the pipe 8*a* that connects between the cyclone collector 6 and the evaporator 1 serving as the apparatus main body.

The dry-keeping means 19 includes: a booster pump 20 for sucking the gas (saturated water vapor) separated in the cyclone collector 6; a heater 21 for heating the sucked air; and a line 22 including a pipe and the like that connect the booster pump 20 and the heater 21 to each other. The booster pump 20 is connected through the intermediation of the pipe of the line 22 to a midway part of the pipe 8*b* that connects between the cyclone collector 6 and the condenser 4*a* of the cooling means 4. On an upstream side of the booster pump 20, there is arranged a filter 23 for eliminating a solid contained in the gas to be sucked. The heater 21 is set to heat the gas sucked by the booster pump 20 to such a temperature as to prevent the gas introduced into the inside of the pipe 8*a* by the dry-keeping means 19 from causing heat degeneration of the powder product discharged from the evaporator 1. The gas heated by the heater 21 is brought into the inside of the pipe 8*a* via a pipe part of the line 22 that is connected to a part of the pipe 8*a* close to the outlet 1*a* of the evaporator 1.

In the vacuum-pressure spray-drying apparatus according to the ninth embodiment, the part of the gas separated in the cyclone collector 6 is introduced into the dry-keeping means 19 through suction performed by the booster pump 20, and is heated and dried by the heater 21. In this state, the part of the gas is introduced into the inside of the pipe 8*a* connecting between the evaporator 1 and the cyclone collector 6, and is returned to the cyclone collector 6. Further, the powder product and the superheated water vapor discharged from the evaporator 1 via the pipe 8*a* are merged and mixed into the dried gas introduced by the dry-keeping means 19. In this state, the powder product and the superheated water vapor are transferred into the cyclone collector 6. Thus, for example, even in a case where a liquid raw material containing a substance having high moisture absorbency is applied as the liquid raw material, the powder product produced from the liquid raw material in the evaporator 1 is prevented from being collected in a moist state in the cyclone collector 6. As a result, owing to additional provision of the dry-keeping means 19, while keeping the degree of vacuum of the evaporator 1 or the like of the vacuum-pressure spray-drying apparatus, it is possible to collect the powder product containing a highly hygroscopic substance while keeping the powder product dry without moistening the powder product.

The above-mentioned moisture absorption occurs as follows. Specifically, the superheated water vapor discharged from the evaporator 1 together with the powder product is reduced in temperature by consuming its thermal energy in a drying step performed in the evaporator 1, and thus is changed into a saturated vapor. The saturated vapor comes into contact with the powder product containing a highly hygroscopic substance. Accordingly, the saturated vapor is changed into the dried gas and then returned into the pipe 8*a* by the dry-keeping means 19, and hence the powder product discharged from the evaporator 1 has less opportunity to come into contact with the saturated vapor, with the result that the powder product is less likely to absorb moisture. By the way, the saturated vapor generated at this time does not cause dew condensation in the pipe 8*a* and the cyclone collector 6.

Tenth Embodiment

Figure 13:
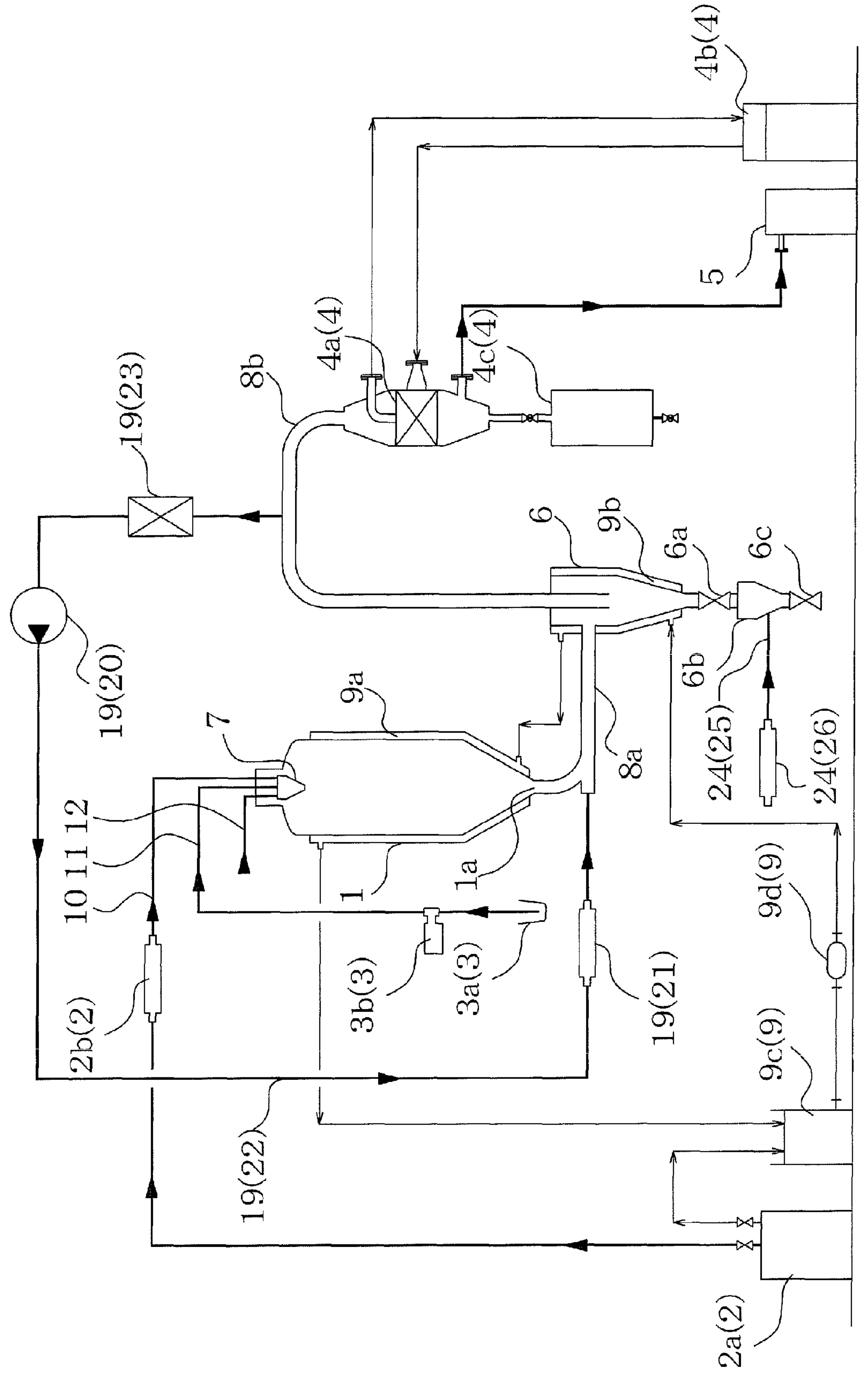
FIG. 13 is an explanatory diagram illustrating a vacuum-pressure spray-drying method and a vacuum-pressure spray-drying apparatus according to a tenth embodiment of the present invention.

FIG. 13 illustrates a vacuum-pressure spray-drying method and a vacuum-pressure spray-drying apparatus according to a tenth embodiment of the present invention.

In the tenth embodiment, unlike the above-mentioned first embodiment (ninth embodiment), in addition to the dry-keeping means 19, there is additionally provided dry-maintaining means 24 for introducing the dried air or nitrogen into an inside of a collecting section for collecting a solid as the powder product separated in the cyclone collector 6.

The dry-maintaining means 24 includes: a line 25 including a pipe and the like that are connected to the product receiver 6*b* serving as the collecting section of the cyclone collector 6, the line 25 introducing the air or nitrogen into the inside of the product receiver; and a heater 26 for heating the air or the like that is to be brought into the line 25. The heater 26 is set to heat the air or the like to be introduced, for example, to such a temperature as to prevent heat degeneration of the powder product collected in the product receiver 6*b*. A quantity of the air or the like to be introduced into the inside of the product receiver 6*b* from the dry-maintaining means 24 is set under a condition that there is substantially no influence on classifying accuracy of the cyclone collector 6 and that the saturated vapor does not enter the product receiver 6*b*. The air and nitrogen are selectively used depending on a degree of susceptibility to oxidation of the powder product. For example, when the powder product is susceptible to oxidation, nitrogen is used.

In the vacuum-pressure spray-drying apparatus according to the tenth embodiment, the powder product separated in the cyclone collector 6 is received in the product receiver 6*b*, and the dried air or the like is introduced into the inside of the product receiver 6*b* of the cyclone collector 6 by the dry-maintaining means 24. The introduced air or the like prevents the saturated vapor from entering the product receiver 6*b*. Thus, for example, even in a case where a liquid raw material containing a highly hygroscopic substance is applied as the liquid raw material, the powder product produced from the liquid raw material has less opportunity to come into contact with the saturated vapor when the powder product is received in the product receiver 6*b* of the cyclone collector 6, with the result that the powder product is less likely to absorb moisture. In the tenth embodiment, also the dry-keeping means 19 is provided, and hence the powder product containing a highly hygroscopic substance is prevented from absorbing moisture at the time of reaching the cyclone collector 6. As a result, owing to additional provision of the dry-keeping means 19 and the dry-maintaining means 24, while keeping the degree of vacuum of the evaporator 1 or the like of the vacuum-pressure spray-drying apparatus, it is possible to reliably collect the powder product containing a highly hygroscopic substance in the product receiver 6*b* of the cyclone collector 6 while keeping the powder product dry without moistening the powder product.

Other Embodiments

Note that, the dry-keeping means 19 according to the ninth embodiment and the dry-maintaining means 24 according to the tenth embodiment can be applied to the seventh and eighth embodiments in the same way. Further, in the tenth embodiment, installation of the dry-keeping means 19 may be omitted, and only the dry-maintaining means 24 may be installed.

Further, also the spray nozzle 7 can have structure obtained by combining the configurations of the spray nozzles described in the respective embodiments. For example, the following structure is applicable to the spray nozzle 7 according to the fifth embodiment illustrated in FIG. 8. Specifically, the plurality of discharge holes 32*c* formed in the flat plate 32*b* of the spray nozzle 7 according to the sixth embodiment illustrated in FIG. 9 are similarly formed in the circular flat plate 31*b* of the spray nozzle 7 according to the fifth embodiment (under a state in which the clearance 31*c* remains).

Alternatively, in each vacuum-pressure spray-drying method and each vacuum-pressure spray-drying apparatus according to the first, second, and seventh to tenth embodiments, at a stage of drying and powdering the liquid raw material in the apparatus main body, the liquid raw material and the superheated water vapor are simultaneously sprayed into the apparatus main body, but as procedures of running of the apparatus, spraying is sometimes performed in the following order. First, at the time of start of running, the superheated water vapor is sprayed into the apparatus main body in advance so as to maintain a stable temperature of the inside of the apparatus main body, and then, the liquid raw material is sprayed into the apparatus main body, to thereby start vacuum-pressure spray-drying operations. Further, it is preferred that, at the time of stop of running, spraying of the liquid raw material be first stopped to stop the vacuum-pressure spray-drying operations, and then spraying of the superheated water vapor be stopped. However, the present invention is not particularly limited thereto.

REFERENCE SIGNS LIST

1 . . . evaporator (apparatus main body)
1*a* . . . outlet
2 . . . superheated water vapor supplying means
3 . . . liquid raw material supplying means
4 . . . cooling means
5 . . . vacuum pump (pressure reducing means)
6 . . . cyclone collector (product collecting means)
6*b* . . . product receiver (collecting section)
7 . . . spray nozzle
7*a* . . . spray port for superheated water vapor
7*b* . . . spout port for liquid raw material
8*a*, 8*b* . . . pipe
9 . . . heat retaining means
19 . . . dry-keeping means
24 . . . dry-maintaining means
71 . . . first spray nozzle
72 . . . second spray nozzle

The invention claimed is:

1. A vacuum-pressure spray-drying method, comprising:
an apparatus main body, which is kept at reduced pressure and comprises a spray nozzle;
superheated water vapor supplying means for supplying a superheated water vapor to the spray nozzle;
liquid raw material supplying means for supplying a liquid raw material to the spray nozzle without heating the liquid raw material;
cooling means for cooling the superheated water vapor and a vapor resulting from volatilization of the liquid raw material being discharged from the apparatus main body, and then collecting, as condensed water;
pressure reducing means for keeping an inside of the apparatus main body at the reduced pressure through the cooling means; and
product collecting means for collecting a powder product produced in the apparatus main body,
the vacuum-pressure spray-drying method comprising:
simultaneously spraying the superheated water vapor supplied from the superheated water vapor supplying means and the liquid raw material supplied from the liquid raw material supplying means through the spray nozzle into the apparatus main body so as to atomize the liquid raw material in the apparatus main body; and
subjecting an atomized raw material, which is produced by atomizing the liquid raw material, to heat exchange with the superheated water vapor, to thereby dry and powder the liquid raw material.

2. A vacuum-pressure spray-drying method according to claim 1,
wherein the apparatus main body comprises an evaporator comprising:
a spray nozzle provided on one end side of the evaporator, for spraying the superheated water vapor and the liquid raw material; and
an outlet formed on another end side of the evaporator in communication to the cooling means, and
wherein the subjecting comprises subjecting the atomized raw material, which is produced by spraying the liquid raw material through the spray nozzle into the evaporator, to heat exchange with the superheated water vapor, to thereby dry and powder the atomized raw material within a period in which the atomized raw material is moved to the outlet along with a flow of the superheated water vapor sprayed through the spray nozzle into the evaporator.

3. A vacuum-pressure spray-drying method according to claim 1,
wherein the apparatus main body comprises an evaporator comprising:
a first spray nozzle provided on one end side of the evaporator, for spraying the superheated water vapor;
an outlet formed on another end side of the evaporator in communication to the cooling means; and
a second spray nozzle arranged on the another end side of the evaporator so as to be opposed to the first spray nozzle with a spacing, for spraying the liquid raw material, and
wherein the subjecting comprises subjecting the atomized raw material, which is produced by spraying the liquid raw material through the second spray nozzle into the evaporator, to heat exchange with the superheated water vapor, to thereby dry and powder the atomized raw material within a period in which the atomized raw material is moved to the outlet along with a flow of the superheated water vapor sprayed through the first spray nozzle into the evaporator.

4. A vacuum-pressure spray-drying method according to claim 1,
wherein the product collecting means comprises a cyclone collector arranged between the apparatus main body and the cooling means, and
wherein the vacuum-pressure spray-drying method further comprises carrying the powder product dried and powdered in the apparatus main body into the cyclone collector along with exhaust gas transferred from the apparatus main body to the cooling means, and collecting the powder product in the cyclone collector after separating the powder product into a solid and gas.

5. A vacuum-pressure spray-drying method according to claim 4, further comprising collecting and drying a part of the gas separated in the cyclone collector, and then introducing and returning the part of the gas into an inside of a pipe connecting between the apparatus main body and the cyclone collector.

6. A vacuum-pressure spray-drying method according to claim 4, further comprising introducing dried air or nitrogen into an inside of a collecting section for collecting the solid separated in the cyclone collector as the powder product.

7. A vacuum-pressure spray-drying method according to claim 2, wherein the spray nozzle comprises a nozzle which comprises:
a spray port formed at a center position of the nozzle, for spraying the liquid raw material; and
a spout port formed around the spray port for the liquid raw material, for spouting the superheated water vapor.

8. A vacuum-pressure spray-drying method according to claim 3, wherein the second spray nozzle comprises a nozzle which comprises:
a spray port formed at a center position of the nozzle, for spraying the liquid raw material; and a spout port formed around the spray port for the liquid raw material, for spouting the superheated water vapor.

9. A vacuum-pressure spray-drying method according to any one of claims 1 to 8, wherein the vacuum-pressure spray-drying method is carried out under the following operation conditions of vacuum-pressure spray-drying performed in the apparatus main body:

a degree of vacuum of the inside of the apparatus main body is 2 to 20 kPa;

a vapor temperature of the superheated water vapor supplied from the superheated water vapor supplying means to the spray nozzle is 120 to 250° C.; and a temperature when performing drying in the apparatus main body is 15 to 80° C.

10. A vacuum-pressure spray-drying apparatus, comprising:

an apparatus main body, which is kept at reduced pressure and comprises a spray nozzle;

superheated water vapor supplying means for supplying a superheated water vapor to the spray nozzle;

liquid raw material supplying means for supplying a liquid raw material to the spray nozzle without heating the liquid raw material;

cooling means for cooling the superheated water vapor and a vapor resulting from volatilization of the liquid raw material being discharged from the apparatus main body, and then collecting, as condensed water;

pressure reducing means for keeping an inside of the apparatus main body at the reduced pressure through the cooling means; and product collecting means for collecting a powder product produced in the apparatus main body, wherein the spray nozzle comprises a nozzle which comprises:

a spray port formed at a center position of the nozzle, for spraying the liquid raw material; and a spout port formed around the spray port, for spouting the superheated water vapor, and wherein the vacuum-pressure spray-drying apparatus is configured to:

simultaneously spray the superheated water vapor supplied from the superheated water vapor supplying means and the liquid raw material supplied from the liquid raw material supplying means through the spray nozzle into the apparatus main body so as to atomize the liquid raw material in the apparatus main body; and subject an atomized raw material, which is produced by atomizing the liquid raw material, to heat exchange with the superheated water vapor, to thereby dry and powder the liquid raw material.

11. A vacuum-pressure spray-drying apparatus according to claim 10, wherein the apparatus main body comprises an evaporator comprising:

a spray nozzle provided on one end side of the evaporator; and an outlet formed on another end side of the evaporator in communication to the cooling means, and wherein the vacuum-pressure spray-drying apparatus is further configured to subject the atomized raw material, which is produced by spraying the liquid raw material through the spray nozzle into the evaporator, to heat exchange with the superheated water vapor, to thereby dry and powder the atomized raw material within a period in which the atomized raw material is moved to the outlet along with a flow of the superheated water vapor.

12. A vacuum-pressure spray-drying apparatus, comprising:

an apparatus main body, which is kept at reduced pressure and comprises a spray nozzle;

superheated water vapor supplying means for supplying a superheated water vapor to the spray nozzle;

liquid raw material supplying means for supplying a liquid raw material to the spray nozzle without heating the liquid raw material;

cooling means for cooling the superheated water vapor and a vapor resulting from volatilization of the liquid raw material being discharged from the apparatus main body, and then collecting, as condensed water;

pressure reducing means for keeping an inside of the apparatus main body at the reduced pressure through the cooling means; and product collecting means for collecting a powder product produced in the apparatus main body, wherein the spray nozzle comprises:

a first spray nozzle comprising a spout port for spouting the superheated water vapor; and a second spray nozzle comprising a spray port for spraying the liquid raw material, and arranged so as to be opposed to the first spray nozzle with a spacing, and wherein the vacuum-pressure spray-drying apparatus is configured to:

spray the superheated water vapor supplied from the superheated water vapor supplying means through the first spray nozzle into the apparatus main body while spraying the liquid raw material supplied from the liquid raw material supplying means through the second spray nozzle into the apparatus main body so as to collide with the superheated water vapor and atomize the liquid raw material in the apparatus main body; and subject an atomized raw material, which is produced by atomizing the liquid raw material, to heat exchange with the superheated water vapor, to thereby dry and powder the liquid raw material.

13. A vacuum-pressure spray-drying apparatus according to claim 12, wherein the apparatus main body comprises an evaporator comprising:

a first spray nozzle provided on one end side of the evaporator;

an outlet formed on another end side of the evaporator in communication to the cooling means; and a second spray nozzle arranged on the another end side of the evaporator so as to be opposed to the first spray nozzle with a spacing, and wherein the vacuum-pressure spray-drying apparatus is further configured to subject the atomized raw material, which is produced by spraying the liquid raw material through the spray nozzle into the evaporator, to heat exchange with the superheated water vapor, to thereby dry and powder the atomized raw material within a period in which the atomized raw material is moved to the outlet along with a flow of the superheated water vapor sprayed through the first spray nozzle into the evaporator.

14. A vacuum-pressure spray-drying apparatus according to claim 10 or 12, wherein the product collecting means comprises a cyclone collector arranged between the apparatus main body and the cooling means, and wherein the vacuum-pressure spray-drying apparatus is further configured to carry the powder product dried and powdered in the apparatus main body into the cyclone collector along with exhaust gas transferred from the apparatus main body to the cooling means, and collect the powder product in the cyclone collector after separating the powder product into a solid and gas.

15. A vacuum-pressure spray-drying apparatus according to claim 14, further comprising dry-keeping means for collecting and drying a part of the gas separated in the cyclone collector, and then introducing and returning the part of the gas into an inside of a pipe connecting between the apparatus main body and the cyclone collector.

16. A vacuum-pressure spray-drying apparatus according to claim 14, further comprising dry-maintaining means for introducing dried air or nitrogen into an inside of a collecting section for collecting the solid separated in the cyclone collector as the powder product.

17. A vacuum-pressure spray-drying apparatus according to claim 10 or 12, wherein the apparatus main body and/or the cyclone collector comprises heat retaining means for keeping a warm state of an inner wall surface of the apparatus main body and/or an inner wall surface of the cyclone collector to prevent dew condensation.

18. A vacuum-pressure spray-drying apparatus according to claim 12, wherein the second spray nozzle comprises a nozzle which comprises:

a spray port formed at a center position of the nozzle, for spraying the liquid raw material; and a spout port formed around the spray port for the liquid raw material, for spouting the superheated water vapor.

19. A reduced-pressure spray-drying apparatus according to claim 14, wherein the apparatus main body and/or the cyclone collector comprises heat retaining means for keeping a warm state of an inner wall surface of the apparatus main body and/or an inner wall surface of the cyclone collector to prevent dew condensation.

* * * * *